United States Patent [19]

Kauffman

[11] Patent Number: 4,512,394
[45] Date of Patent: Apr. 23, 1985

[54] VARIABLE EFFECT ABSORPTION MACHINE AND PROCESS

[75] Inventor: Kenneth W. Kauffman, 4920 City Line Ave., Apt. #A207, Philadelphia, Pa. 19131

[73] Assignee: Kenneth W. Kauffman, Philadelphia, Pa.

[21] Appl. No.: 554,989

[22] Filed: Nov. 25, 1983

Related U.S. Application Data

[63] Continuation-in-part of Ser. No. 207,791, Nov. 17, 1980, Pat. No. 4,442,677.

[51] Int. Cl.³ .............................................. F28F 5/02
[52] U.S. Cl. ........................................ 165/86; 62/476
[58] Field of Search ................. 62/476; 165/86, 86 H, 165/89

[56] References Cited

U.S. PATENT DOCUMENTS 1,959,120  5/1934  Ziska ................................. 165/89 X
3,495,951  2/1970  Tanaka et al. ..................... 165/89 X

*Primary Examiner*—Stephen F. Husar
*Attorney, Agent, or Firm*—John C. Dorfman

[57] ABSTRACT

A thermal machine includes a horizontal rotatable shaft extending through a cylindrical housing which contains the at least high and low pressure stages. The shaft carries a pair of cylindrical drum heat transfer means within the housing to rotate with the shaft. All or part of both drums contain an intermediate pressure stage, with pool collection capability within the drums using annular rims to retain the absorbent solutions. The outer housing has means to permit collection of absorbent solutions in separate pools in contact with the respective outer sidewall surfaces of the drums. Such contact provides thermal coupling between stages. Additional sections of the drums may contain pools for external circulants, which drum sections also contact the pools in the outer housing. Sealing means permits rotation of the respective drum means but isolates the vapors within the drums from the pools within the outer housing and vapors from the outer housing pools from one another. Piping is provided for the flow of an absorbent solution among the vessels in different stages and conduits may permit vapor flow from one vessel to a second within a stage. In some applications, the drum may be corrugated and wiped for enhanced heat transfer.

15 Claims, 31 Drawing Figures

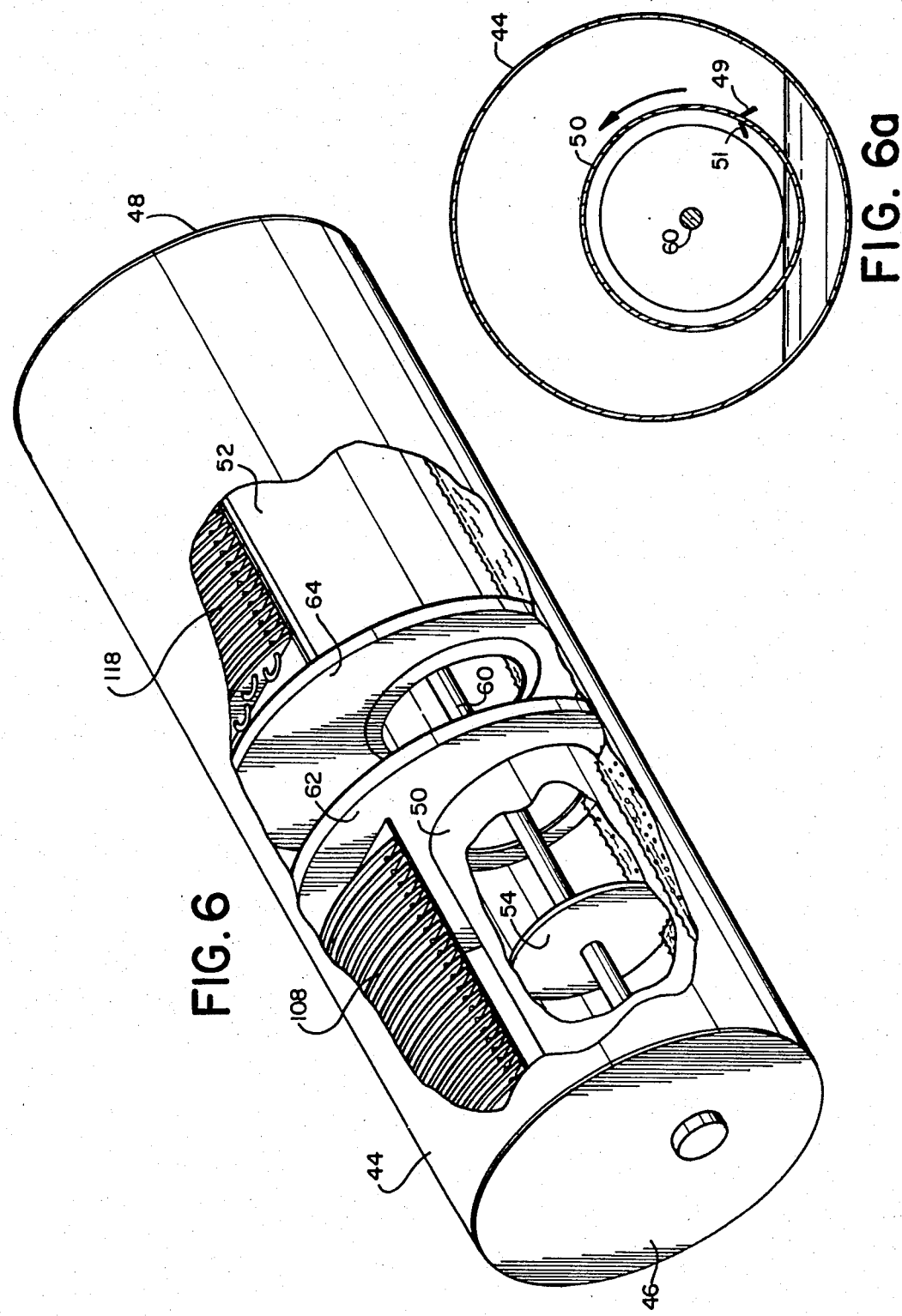

VARIABLE EFFECT ABSORPTION MACHINE AND PROCESS

This is a continuation-in-part application of U.S. Ser. No. 207,791, filed Nov. 17, 1980 now U.S. Pat. No. 4,442,677.

The present invention concerns a novel thermodynamic cycle or a family of cycles and a machine or group of machines which embody processes using the cycles to produce a cooling, heat pumping, or temperature amplification effect. Certain specialized versions of the machine may be coupled with additional equipment to produce shaft power or to operate separation processes such as desalination.

The novel process is known as variable effect absorption. The variable effect absorption process is so named because a variable amount of the absorption subprocess heat is transferred to the generation subprocess. It offers two characteristics superior to prior art processes. First, the process may function as single effect, double effect, or any state between those extremes so that it adapts to variable conditions of operation. Second, heat exchange pinch effects typical of the prior art and which damage efficiency, decrease utilization and increase auxiliary power needs are very small for the variable effect process. The machine may employ a novel rotating counterflow heat exchanger designed to provide the maximum benefits from these process characteristics. The significance of this is explained below in terms of examples.

PRIOR ART

In the prior art there have been a multitude of theoretical and real thermodynamic processes familiar to heating, air conditioning, and refrigeration engineers and to those involved in related areas such as power generation, or desalination. Both single effect and double effect absorption processes have been known. The single effect process has been a process involving a single loop usually with a single two component fluid undergoing change of state and concentration and heating and cooling in the course of the process. Double effect processes have involved one or two such loops which may employ the same or different fluids sometimes confined to their own loops, but having heat exchange relationships between the two loops such that the effects of the process of one aids in the process of the other and vice versa. Many possibilities of intermediate solution situations exist, too, such as where one of the loops is open rather than closed. Within these processes vapors are generated at one constant pressure and absorbed at a second different pressure. This is true also for Rankine processes, in which the fluid is usually a single material and the difference in pressure of vapors is used to drive a Rankine converter for power generation or is created by a Rankine converter for a heat pumping or chilling effect.

In the prior art there have been theoretical and practical limitations on the efficiency of such processes. The absorption processes have been confined to relatively fixed temperature differences between input and output stations for their practical effects with different ranges being achieved by different kinds of fluids. Different kinds of fluids are employed in order to achieve desired heat input and output temperatures determined particularly by the boiling points of the selected fluid and, in some instances, the freezing point, and not independently selectable for optimal matching to specific applications.

The prior art processes, including both absorption and Rankine processes, have their performance degraded by pinch effect penalties which result from their being designed to operate with constant temperature sources and sinks. Heat exchange pinch effects penalize performance, equivalent to decreasing the source temperature and increasing the sink temperature, and efforts to decrease the penalties result in limitations on utilization of the heat source and sink, and in increased auxiliary requirements. For example, suppose an application uses hot waste water which is run through a heat pump or other machine then discarded. For processes designed for a constant temperature source, the effective input temperature for calculating theoretical efficiency is the leaving temperature of the water (minus a heat exchange approach temperature difference). If the leaving temperature were made low (near ambient) in order to utilize a large amount of heat from the waste water, the process efficiency would be low. If the leaving temperature were only 10° to 20° F. less than the entering temperature, process efficiency is only slightly damaged, but little heat is recovered from the waste stream. In determining a compromise temperature drop, auxiliary power is also a consideration. The smaller the temperature drop or rise, the greater are the flows of external fluids needed for a given heat input or output. External electrical power for pumps and/or fans is particularly a large fraction of total energy input in many space heating and cooling applications, and especially for those using air cooled prior art absorption equipment.

THE NATURE OF THE PRESENT INVENTION

In accordance with the variable effect of the present invention, the amount of heat transferred from the absorber to the generator, and hence the coefficient of performance is determined by the temperatures of the heat sources and heat sinks. The adaptability of the variable effect process to independent variation of input and output temperatures is particularly advantageous for applications using an ambient heat source or sink e.g., respectively, for heat pumping or for cooling and power generation, since the ambient temperature varies seasonally. It is also an advantage for applications using a waste or solar heat source which seasonally varies in temperature, or which may vary from one specific installation to another. Use of the variable effect permits a high fraction of theoretical performance to be achieved with broad ranges of independent variation in those temperatures. That is, if temperature conditions become more favorable, the variable effect process is able to take advantage of the change to achieve better performance. The state-of-the-art absorption processes do not, and cannot respond with improved performance as does the variable effect process. For example, operated with solar or waste heat, the machine automatically adjusts to changing heat input and/or rejection temperatures to maintain a high fraction of theoretical performance, which cannot be achieved with the conventional machines. Used with fossil heat alone, the seasonal heating and cooling performance is better than with an electric heat pump or furnace, so that a back-up heating and cooling system would not be needed if the machine were used with a small solar collector array. For another example, the annual power generated from waste heat sources is increased by use of the variable effect process because optimal benefits are derived from seasonal variation in the ambient sink temperature.

The variable effect process also accepts and rejects heat over large ranges of temperture. This variable response permits small heat exchange pinch effects, i.e., a better match to sensible heat sources such as solar or waste heat and to sensible sinks such as ambient or conditioned air. Therefore, referring to the waste heat example in prior art above, the leaving temperature may be closer to ambient and a good fraction of heat is recovered. The efficiency is determined by the log mean input temperature (approximately the arithmetic mean), not the leaving temperature. Therefore, both efficiency and utilization, the fraction of heat recoverable, are higher for the variable effect than for other processes. Pumping power for the variable effect machine is smaller because of the larger temperature ranges through which fluids are cycled. This applies to solution pumps and to pumps or fans for the heating and cooling circulants.

A large range of input temperature also permits a simultaneous heat input from solar or waste heat at a low temperature and auxiliary (fossil) heat at higher temperature. As a consequence, for example, that solar cooling can be accomplished with a great variety of collector array sizes and types, and which need not be designed for the requirements of the more rigid thermal processes of conventional machines.

Preferred embodiments of the process equipment use a rotary drum heat exchanger on which an absorption fluid releases and absorbs the volatile absorption fluid component. This device may be used with the variable effect or other absorption processes. The advantages of the device are obtained through integration of the following requirements of absorption equipment:

1. Structurally efficient staging and mechanical support is provided by using a drum as a structural member which separates the housing volume into two isolated volumes. Circumferential extending of the drum means adds strength and rigidity and permits the use of a lightweight thin-walled drum which also enhances heat transfer across the wall;

2. Control of fluid volume mixing for thermodynamic efficiency is provided by segmentation with the circumferential extensions of the axially counterflowing fluid volumes;

3. Uniform absorbent fluid distribution as films for efficient mass transfer with vapor is provided by rotation of the drum continuously through the absorption fluid gravity pool(s) and vapor volume(s);

4. Compactness is provided by drums designed with extended surface areas many times the plain cylindrical area.

Use of this invention to integrate these functions in absorption machines provides the following advantages compared to the prior art:

1. Easier mass-fabrication and assembly of equipment and improved reliability due to its single unit construction and due to formation of the basic extended-surface drum by efficient mass-production techniques, for example, by hydraulic forming of corrugations, by continuous welding of helical fin or by press-fitting or circular fins;

2. Easier shipping and installation due to its compactness and lower weight, resulting from the strengthening by the extensions and the inherently compact geometries;

3. Reduces requirements for materials due to its saving of separate parts otherwise needed for the various functions it serves, due to its light weight, due to high heat transfer coefficients resulting from optimal fluid velocities, and due to improved thermal efficiency, as described below, which reduces the heat throughput required per unit of output;

4. Improved energy efficiency due to segmentation of fluid flows to provide true counterflow over large temperature ranges, and for other reasons given below.

In the prior art there are well known penalties for temperature crossing, which apply to any multi-pass heat exchanger which is not true counterflow. The benefits of counterflow heat exchange for single effect absorption air conditioning are well known in the art, discussed for example in the Proceedings of the 1979 ASHRAE annual meeting. The large temperature and concentration ranges which may be employed without crossing penalties using this invention, and which are not practical using the prior art, reduce the required absorption fluid flow rates per unit of desired effect (recirculation rates) and reduce solution heat recovery needs, pumping power and thermal penalties for heat exchanger effectiveness. Furthermore, the flow rates of the external fluid heat source or heat sink or both can also be reduced by using large temperature ranges for the absorption boiling and condensing processes, which is particularly desirable for saving fan power for devices such as an exhaust gas heated generator or air cooled absorber.

Very large energy efficiency improvements and large savings in heat exchanger area can be achieved using the rotating drum heat exchanger with certain advanced absorption cycles, those for which heats must be transferred between two absorption fluids in separate pressure stages. Examples of these are the "fat" single effect (or GAX) cycles, the common condenser double effect cycle, the regenerative single effect cycle, and the regenerative double effect cycle, as well as the variable effect cycle.

In the prior art, what now appears to be an erroneous conclusion had been reached based upon the nature of processes in currently available equipment. The assumption was that the countercurrent absorber arrangement must inevitably involve an intermediate fluid to exchange heat between the absorber and generator. This was assumed because, within the conventional vertical absorber, liquid travels downwards under the influence of gravity as the vapor is absorbed, establishing a temperature profile which increases from bottom to top. This temperature gradient is in conflict with that established in the generator, which also uses gravity to drain the liquid, and, so, therefore, an intermediate fluid was assumed to be required to match the gradients.

The present invention negates the conclusion that an intermediate sensible heat transfer fluid is needed to transfer heats between two absorption fluids (one boiling and one condensing). With the rotating drum means of the invention being horizontal and rotating through pools, absorption fluids may flow counter to each other, inside and outside of the drum, each through its own isolated vapor space. This permits saving the costs of the intermediate loop equipment, auxiliary energy for the loop flow and two thermal performance penalties for transfer between a boiling/condensing fluid and a sensible fluid (pinch effects). Large savings in the heat exchanger area are achieved because two sensible heat transfers with an intermediate fluid are replaced by one boiling/condensing transfer. The fat single effect cycle with an open evaporator has been mentioned in the art as being of particular interest for separation applications such as desalination, waste water clean-up, product drying or concentrating or solvent recovery. In these applications and with the device of the present invention, as much as 90% of the generator heat can be provided by transfer from the absorber across the rotating heat exchanger, over a fluid temperature span of about 200° F. Compared to the use of an intermediate fluid, the invention saves 80% of the primary heat exchange surface. The common condenser double effect cycle has been described in the literature of the art as being of particular interest for space heating and cooling. It achieves the highest performance and lowest heat exchanger area requirement per unit of desired effect of any of the known double effect cycles. With this cycle and the device of the present invention about 33% of the primary surface area can be saved compared to the same cycle in a machine using an intermediate fluid. The performance improvements for applications of the variable effect cycle to space heating and cooling, refrigeration, heat upgrading and others have been mentioned above and will be explained further below in the description of the drawings. Without the rotating heat exchanger and absorption fluid vapor absorbing and releasing device, the variable effect process would require two intermediate fluid loops for internal heat transfer.

The rotating counterflow heat exchanger is a horizontally oriented drum in contact with liquid gravity pools and vapor spaces on its inside and outside surfaces, such that continuously received absorption fluids on the inside and outside of the drum can exchange heat with each other and can absorb or release the volatile fluids within their respective vapor spaces. This configuration solves an outstanding problem recognized in the prior art as a limitation on the application of various advanced absorption cycles, and including the variable effect cycle disclosed herein, which require internal heat transfer between two absorption fluids. The device is energy efficient and compact with circumferential surface extension and saving of materials through use of thinner gauges of metal. It is more easily produced than absorption process heat exchangers of the prior art. It is also particularly advantageous in certain embodiments employing surface extension for use with sensible fluids including air or liquids in exchanging heat between these and absorption fluid and permiting the efficient absorption or release of vapor from the absorption fluid to the vapor space(s) defined by the drum and its housing.

GENERIC DESCRIPTION

A machine of the present invention is comprised of three pressure stages, each containing an absorbent fluid from which gas or vapor is evolved and/or into which gas or vapor is absorbed. Gas or vapor flows from a regenerator to a resorber in an intermediate pressure stage. The heat for the regenerator may be provided by the absorption of vapor in the absorber, which is located in a second pressure stage, and heat provided by the resorber may be transferred to the generator in a third pressure stage. Means are provided for the flow of absorbent fluid through and among the generator, absorber, regenerator and resorber, for the flow of gas or vapor between the regenerator and resorber and to the absorber and from the generator, and for the transfer of heat to, from, and among these. The amount of gas or vapor produced by the generator is ultimately absorbed by the absorber at the same rate, thus providing for steady state operation of a process cycle. The gas or vapor has different thermodynamic potential in the second stage containing the generator and the third stage containing the absorber on account of their different pressures; thus, as gas or vapor is transferred, work of several kinds may be produced or used by the machine, so that it may serve many purposes.

A machine in accordance with the present invention in various modifications may be used for fuel fired, solar, or waste heat actuated heat pumping, refrigeration or temperature amplification or for desalination or other separation processes. Other modifications permit use of the process for improved efficiency of power generation, especially with solar, waste heat, and ocean thermal sources, or for improved performance of compression (electric) heat pumps.

For example, the machine may contain an evaporator within the same pressure stage as the absorber and a condenser within the same pressure stage as the generator; so that, the machine may serve for heat pumping, refrigeration, temperature amplification, or desalination and other separation processes. The evaporator and condenser may use a component of the absorbent fluid (pure liquid refrigerant), an absorbent fluid of the same or different composition from that used in the generator or absorber, or liquids on which separation work is to be performed; in all cases the liquid in the evaporator and condenser must contain at least the condensed state of the gas or vapor transferred to and from these components.

A machine of this type is comprised of three pressure stages, each containing absorbent solutions in which vapor is condensed and evolved. Thus, vapor flows from a generator to a condensor in one stage, from a regenerator to a resorber in a second stage, and from an evaporator to an absorber in a third stage. Excepting the evaporator and condenser in one favored version of the machine, the vessels are provided with a flow path for the absorbent solution and means for counterflow heat exchange with a second fluid. The second fluid may be a sensible heating or cooling circulant or absorbent solution in a different pressure stage. Various heat exchangers may be used for the recovery of sensible heat from vapor, liquid refrigerant, and solutions.

For a second example, the machine may contain a Rankine converter through which the gas or vapor is passed between the generator and absorber containing pressure stages; so that, the machine may serve for power production, or for production of heating and cooling effects by mechanical means, such as augmentation of the performance of electrically driven heat pumps or refrigeration equipment. These configurations permit the Rankine subprocess to be matched to sensible heat sources and sinks for improved performance.

Compared to conventional single effect absorption machines, the variable effect machines require relatively more heat exchange capacity and an additional pressure staging. This is true also for the conventional double effect machine. For example, the solar cooling version of the machine requires about one-quarter additional heat exchange capacity to be accomplished per unit of output compared to single effect machines. However, improved performance should readily compensate the added hardware and installation costs, if any, because it permits a much greater benefit to be achieved from the investment in solar collectors. A novel approach to heat exchange is also offered, the increased efficiency of which may more than compensate for the additional heat exchanging capacity requirement without requiring additional heat exchange surface.

In one most simple but less effective version of the machine the second fluid heating circulant flows from the heat source to the generator, to the resorber, and back to the heat source; and a cooling circulant flows from the heat sink to the absorber, to the regenerator, and back to the heat sink. Conventional stationary heat exchangers are used in this version.

In a second version of the machine, a rotating heat exchanging cylinder containing the regenerator and resorber at intermediate pressure contacts portions of the absorber and generator fluid flows, so that its wall is continuously coated with solutions on both sides which flow parallel to the rotation axis.

A third favored version of the machine extends the rotating heat exchanger to include all of the absorber and generator. Other versions of the machine use two such cylinders to accomplish heat exchange with the evaporator and condenser as well.

The rotating heat exchanger permits the unique potential for small heat exchange pinch penalties of the variable effect machine to be fully realized in practice.

SPECIFIC DESCRIPTION OF THE DRAWINGS

The present invention will be better understood by reference to the accompanying drawings in which:

FIG. 6 is a perspective view of a novel preferred machine and rotating heat exchanger in accordance with the present invention in which a single fluid variable effect process may be carried out;

FIG. 6a is a transverse sectional view taken along line 6a—6a of FIG. 6;

EXPLANATION OF THE VARIABLE EFFECT PROCESS

Figure 1:
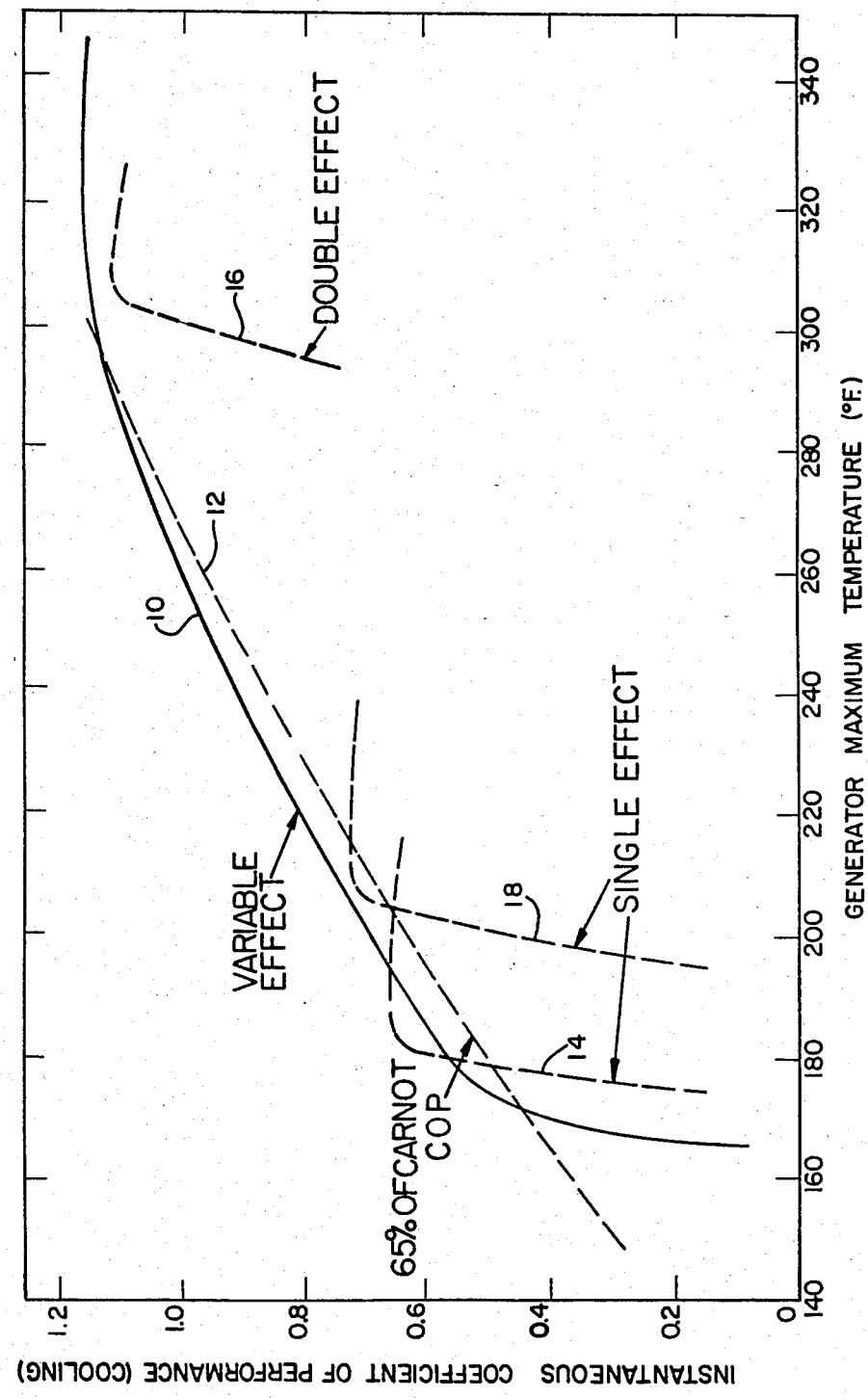
FIG. 1 is a chart plotting instantaneous coefficient of performance (cooling) against generator maximum temperature, comparing prior art single and double effect with the variable effect of the present invention relative to 65 percent of theoretical Carnot coefficient of performance.

FIG. 1 is an illustration by which the response of a machine using the variable effect process can be compared with those of machines using single or double effect processes.

Referring now to FIG. 1, generator maximum temperature is plotted against instantaneous coefficient of performance (hereafter sometimes referred to as COP) for cooling for prior art processes and the variable effect process. The variable effect process is represented by the solid line 10. It will be seen to extend from a relatively low temperature to a relatively high temperature and over a substantial portion of its range to be above 65 percent of Carnot coefficient of performance which is illustrated by the dashed line 12. A comparison is made with various prior art techniques. Specifically, commercial lithium bromide-water machines are illustrated by plots 14 and 16. The plot 14 for the single effect machine using this solution is shown to have a relatively low generator temperature, whereas the plot 16 for the double effect machine lies at a relatively high temperature. The temperature range of efficient operation in each case is obviously quite limited compared with that of the variable effect machine. A plot 18 for a further single effect machine employing commercial ammonia-water solution has a different temperature range from that of the single effect machine using commerical lithium bromide-water, but is equally limited. Lithium bromide-water or ammonia-water or other fluids may be used in the variable effect machine. These curves assume a minimum temperature of 110° F. in the condenser and absorber and 40° F. in the evaporator.

The variable effect process is seen to provide increased performance as the generator temperature is increased, maintaining approximately 65 percent of Carnot efficiency (plot 12); single and double effect processes achieve that efficiency only at a single optimum generator temperature. Similar behavior is observed for variations in the reject (condenser and absorber) or cold source (evaporator) temperature.

The penalties resulting from heat exchange pinch effects are not apparent from FIG. 1, but have been explained above.

There have been recent efforts, by Carrier Corporation, for example, to improve the single effect process by using counterflow heat exchange for generation and absorption and thereby to reduce pinch effects. However, the improvement is minor compared to that of the variable effect process because the temperature range used is only about a third of that for the variable effect, and because the machine coefficient of performance is, to a first approximation, not improved by absorbing some of the heat at a higher temperature (i.e., COP versus temperature is still of the form for the single effect process of FIG. 1). Kim Dao, Lawrence Berkeley Laboratory, University of California, has described two new absorption processes, "single and double effect regenerative cycles", which respond to variations in source and sink temperature much as the variable effect process. However, the regenerative cycle heat inputs and outputs are effectively at constant temperature, so that heat exchange pinch effects are not reduced, and the equipment required is extremely complex compared to the variable effect machine.

Figure 2:
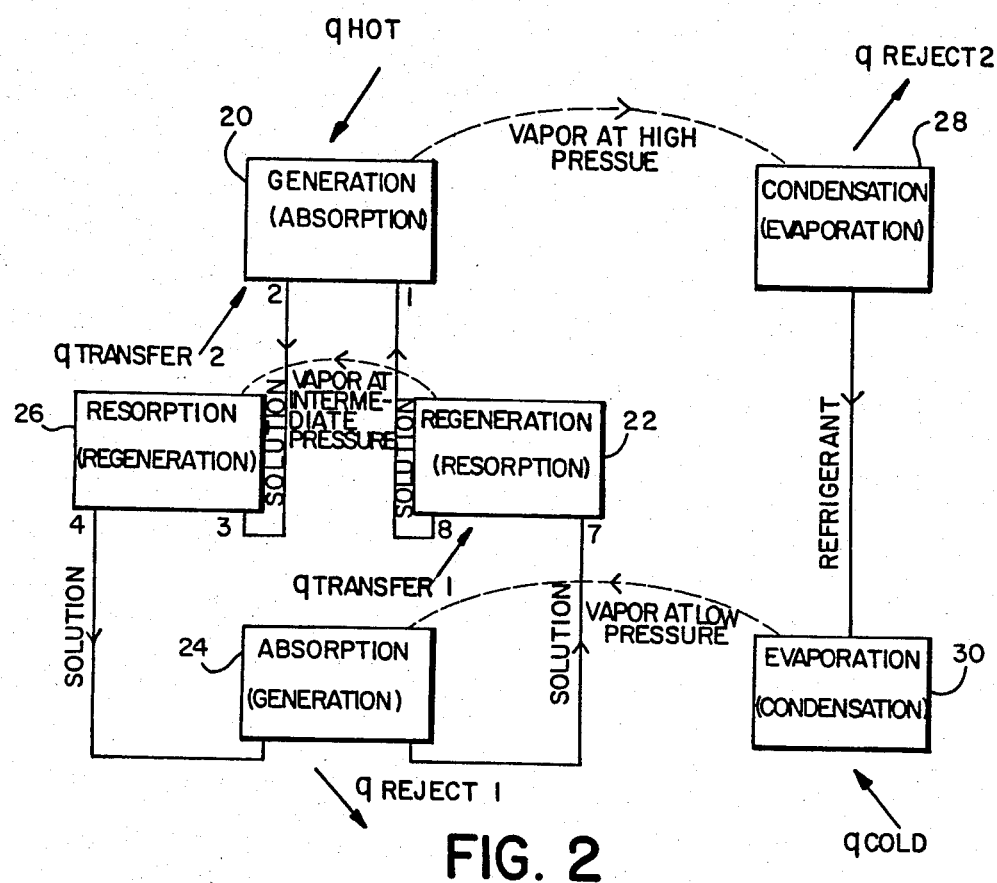
FIG. 2 is a schematic diagram representing a variable effect process flow using a single absorption fluid and therefore representative of a machine using such a process.
Figure 3:
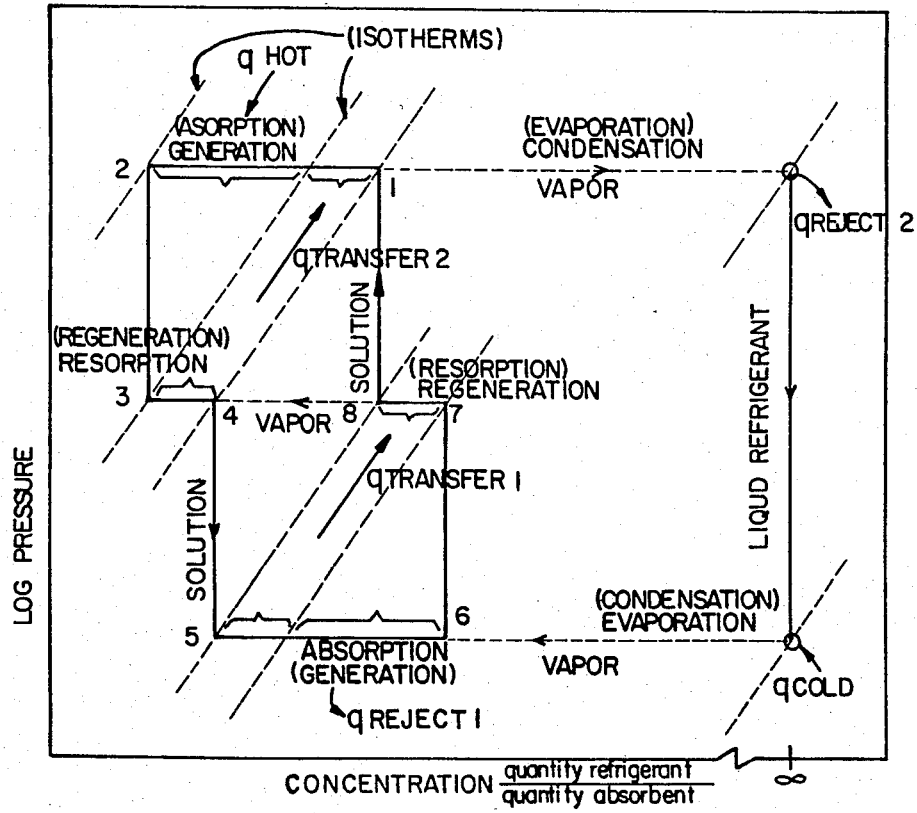
FIG. 3 is a plot of a variable effect thermodynamic cycle using a single fluid as in the process of FIG. 2.
Figure 4:
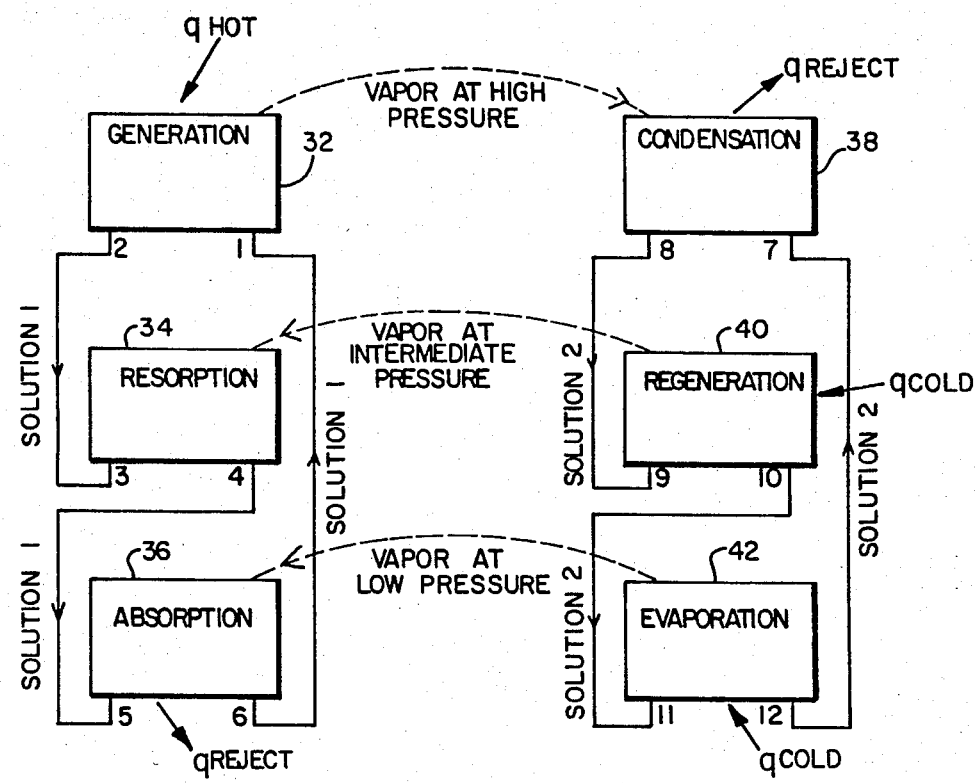
FIG. 4 is a schematic diagram representative of variable effect process using two absorption fluids and representative of a machine employing such a process.

The two broad classes of the variable effect process are illustrated by FIGS. 2 through 5. At each of three constant pressures vapor, or gas, is transferred from a generating (boiling) to a condensing solution at a high pressure, from regeneration to resorption at an intermediate pressure, and from evaporation to absorption at a low pressure. Reverse operation of the process is also possible, where the vapor or gas is transferred from a generating to a condensing solution at low pressure and from evaporation to absorption at high pressure. Absorption working fluids or components of the fluids (i.e., gas, vapor or liquid refrigerant) flow from subprocess to subprocess as indicated in FIGS. 2 and 4. Sensible heat recovery from these flows will be described, but are not included in the figures to avoid confusion by the added legends. The thermodynamic states (concentration, temperature, and vapor pressure) of the solution before and after treatment at each subprocess are indicated by consecutive numbers in the thermodynamic cycles of FIGS. 3 and 5. These correspond to the same numbers in the process flow sheets of FIGS. 2 and 4, following the usual convention for mapping thermodynamic cycles to processes. The same numbering convention is used in describing operation of a variable effect machine below. FIGS. 3 and 5 are thermodynamic cycles for an idealized fluid. The process may be used with any actual absorption fluid. Calculations have been performed for lithium bromide-water, Supersalt-water, water-ammonia, and sodium thiocyanate-ammonia to confirm estimates in plot 10 of FIG. 1. Other fluids containing methanol or R-22 have been considered. Ammonia-water or R-22 with organic amides such as dimethylhexamide or 2-pyrrolidone may be particularly attractive for using the variable effect process with a Rankine converter as discussed below. In addition to these fluid which release condensible vapors on heating, fluids containing dissolved gases, such as ethanolamines-carbon dioxide, soluble carbonates-sulfur dioxide, metal complexes-hydrogen, etc., could be used with the process for special purposes, such as separation and purification of gases or gas containing liquids.

FIG. 2 is a block diagram showing a heat pumping or chilling process using a single fluid loop which can be reversed by changing the functions from those shown in the boxes without parentheses to those shown in the same box within parentheses. A temperature amplification effect (the reverse effect) is obtained with the same subprocesses and interconnections as the former by reversing the direction of all heats and solution flow, and changing the FIG. 2 names given to the subprocesses to those in parentheses. The distinction between heat pump and chiller is made according to the identity of the external circulant heat sources and sinks for a specific application; the process is identical. For example, q hot may be the input from a fuel fired boiler ; q cold, the input from ambient; and q reject 1 and q reject 2 the outputs to a conditioned space; the process then is described as heat pumping. Or q cold may be the input from a conditioned space and q reject 1 and q reject 2 the output to ambient. The process then is chilling or air conditioning. In applying the process for separation, as will be described below, the process remains formally a heat pumping process, though heat is not then the product of interest.

In the heat pumping or chilling mode, externally supplied heat q hot is applied to the generator stage 20. Fluid is circulated from generation to the resorption stage 22 from which heat, q transfer 2, is removed to the generator, displacing some external heat input. Following this the fluid moves to the absorption stage 24 where heat is given up in part to the regeneration stage, q transfer 1, and in part rejected to an external circulant, q reject 1. The fluid is then circulated to the regeneration stage 26 and back to the generation stage 20. Within this absorbent loop vapor flows at intermediate pressure from the regeneration stage 26 back to the resorption stage 22. Outside the absorbent solution loop vapor at high pressure is transferred from generator 20 to a condensation stage 28 in which condensation to liquid refrigerant occurs at 28 due to a cooling effect supplied by an external circulant, q reject 2. Refrigerant moves from the condensation unit 28 to the evaporation unit 30 from which vapor at low pressure is produced by heat input, q cold, from an external circulant and transferred to the absorption section 24 of the main loop.

By FIG. 3 it is shown that changes in concentration of refrigerant in the absorbent fluid occur at each subprocess. Further, the magnitude of concentration change as indicated by the lengths of the horizontal intervals roughly correspond to the relative magnitudes of the heat effects associated with each subprocess. Thus, from state 1 to state 2 the fluid is depleted or refrigerant as heats q transfer 2 and q hot are sequentially input to the generation subprocess. From state 2 to state 3 the fluid is sensibly cooled without change in concentration so that it may be the proper (equilibrium) temperature for use in resorption. In resorption from state 3 to state 4 refrigerant is gained by the fluid and the heat of resorption, q transfer 2, is created. From state 4 to state 5, further sensible cooling occurs prior to absorption. In absorption, heats q transfer 1 and q reject 1 are removed as the refrigerant concentration is increased to state 6. The fluid is then sensibly heated to state 7, and from there to state 8 it losses refrigerant as the heat q transfer 1 is accepted by regeneration. Finally, the fluid is sensibly heated to state 1, thus completing the cycle. The condensation and evaporation subprocesses operate with pure refrigerant, indicated as an infinite concentration of refrigerant. Here heats are not associated with a change in concentration, but only a change in state from liquid to vapor or vice-versa.

The process of FIGS. 2 and 3 includes four subprocesses which operate over ranges of temperature and two processes, condensation and evaporation, which operate (effectively) at constant temperature. This is apparent from FIG. 3. Heat exchange pinch effects are small for the four former subprocesses and large for the two latter subprocesses, except when these are coupled with or replaced by a Rankine subprocess, as will be discussed. Thus, although substantial improvement in reducing pinch effect penalties compared to state-of-the-art processes is obtained, there remains an opportunity for further improvement.

FIG. 4 illustrates an example of a further variable effect process in which there are two absorption fluids in separate loops. The first loop has a generator 32 feeding a resorption stage 34 and finally being fed to a an absorption stage 36 from which, it returns to the generator 32. The second fluid or solution is passed from a condensation stage 38 to a regeneration stage 40, thence, to an evaporation stage 42, whence it is returned to the condensation stage 38. Heat applied at the generation stage 32 generates vapor at high pressure which is transferable to the condensation stage 38. Regenerator 40 provides vapor at intermediate pressure to flow to resorption stage 34. Vapor at low pressure generated at the evaporator 42 may flow to the absorption stage 36.

Figure 5A:
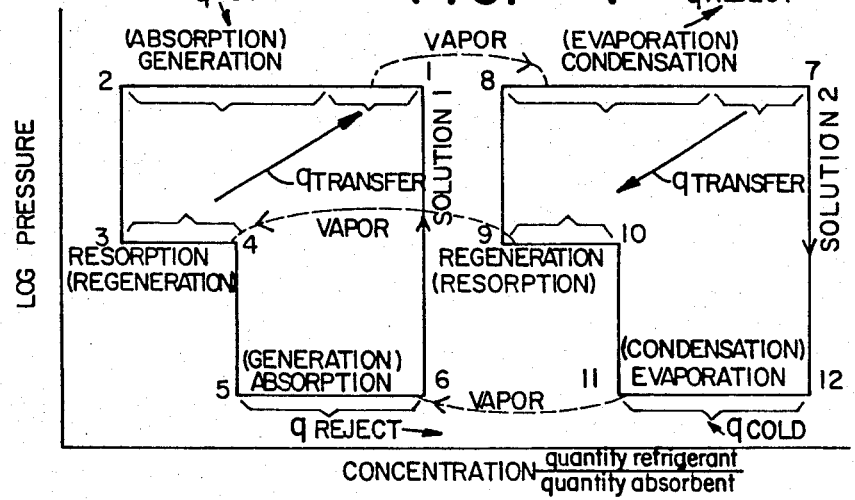
FIGS. 5a through 5h are variable effect thermodynamic cycle diagrams for two fluid processes similar to that of FIG. 4.
Figure 5B:
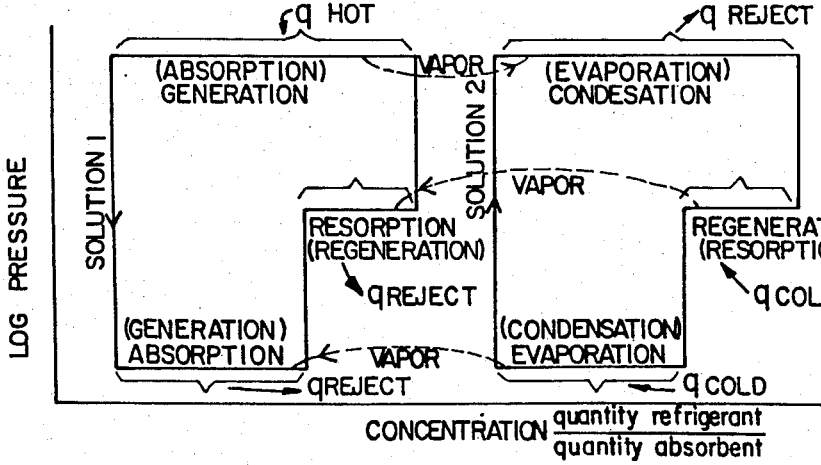
Figure 5C:
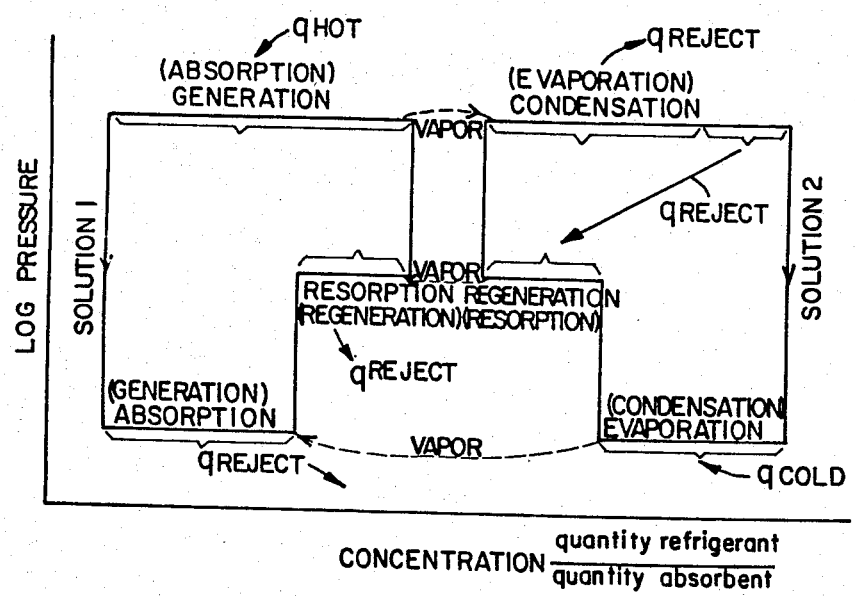
Figure 5D:
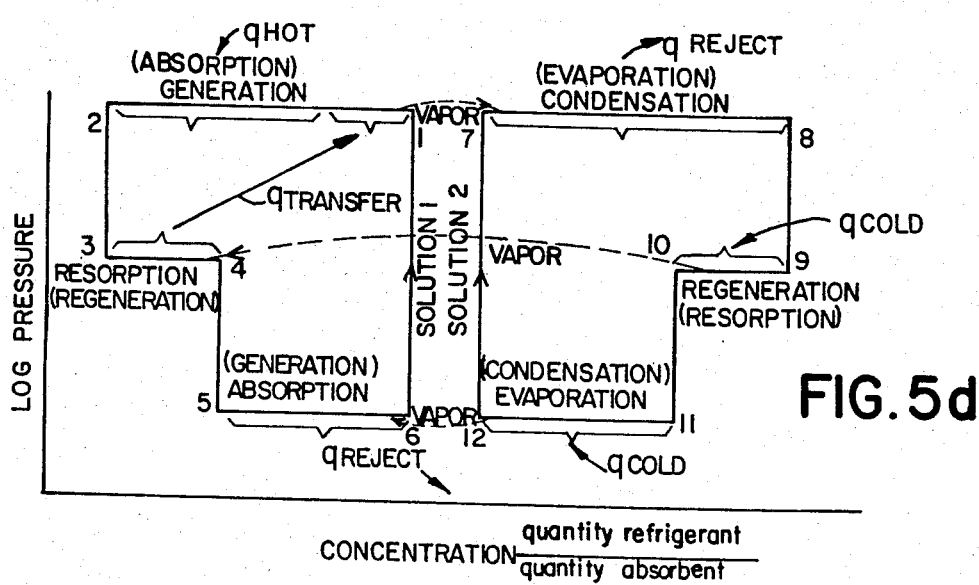
Figure 5E:
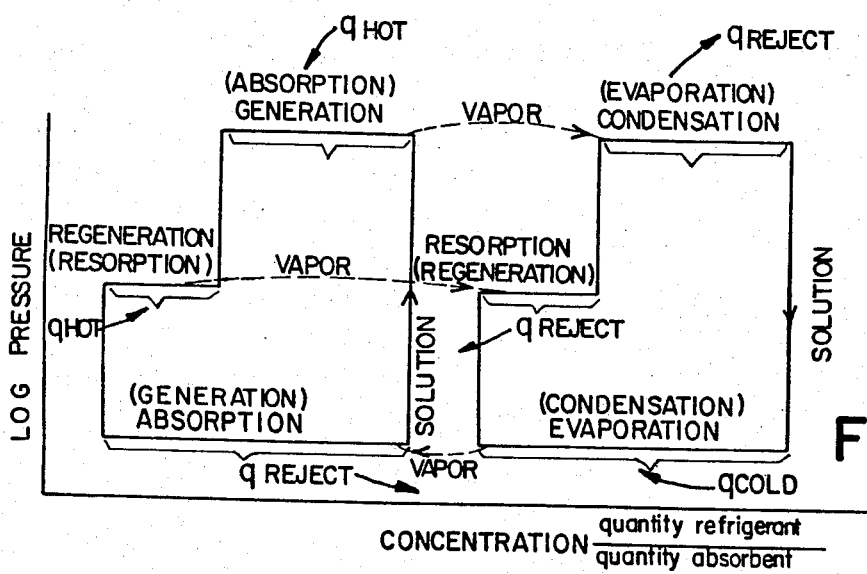
Figure 5F:
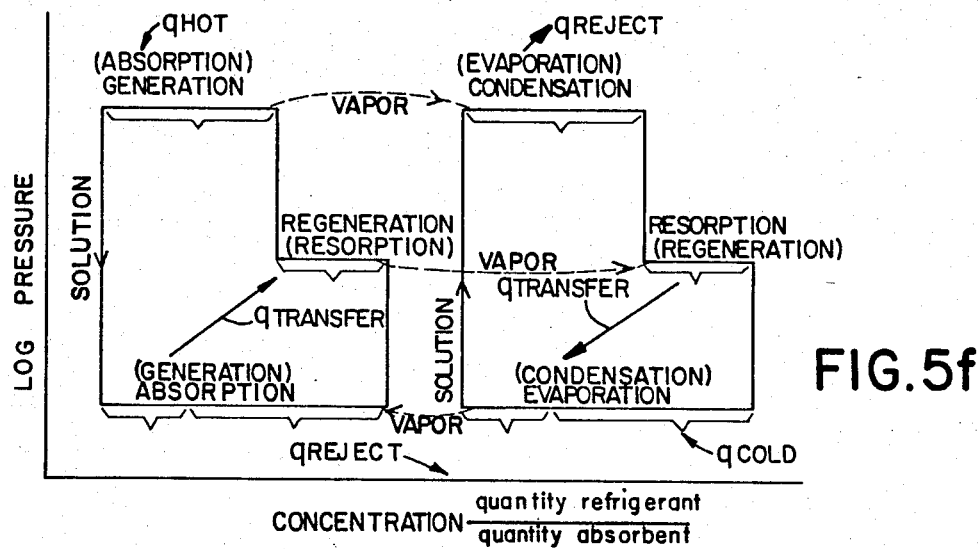
Figure 5G:
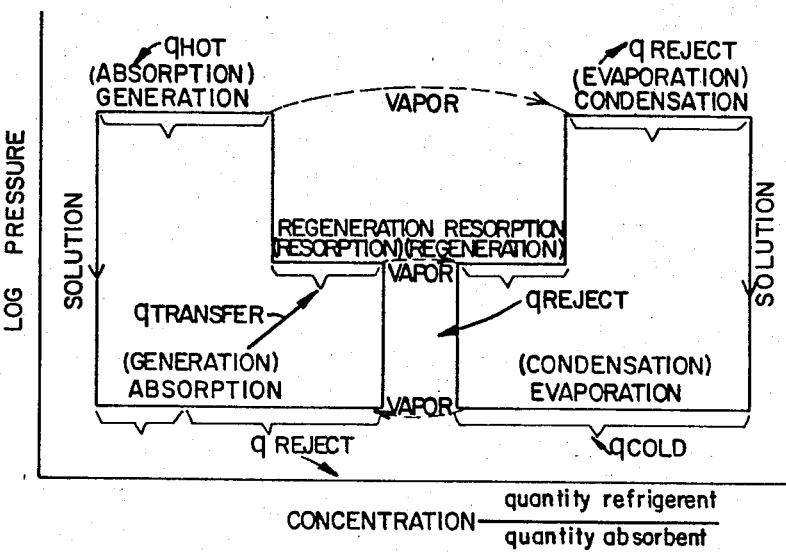
Figure 5H:
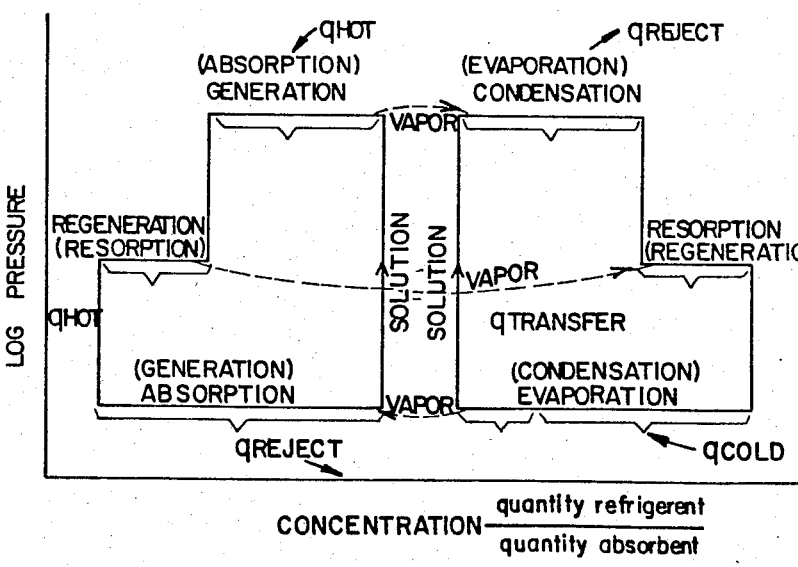

FIG. 5d shows the concentration changes associated with the subprocesses. Numbers are again applied to each solution state to permit comparison of the process with the thermodynamic cycle.

Again, FIGS. 4 and 5d should be considered together to better understand the variable effect using two separate absorption working fluids. With the regeneration and resorption subprocesses operating with different fluids in this case all subprocesses operate over ranges of temperature, and all pinch effects are small. The heat, vapor, and solution directions for this process are also reversible for different effect. There are eight ways of arranging the subprocesses and solution flows illustrated in FIGS. 5a–5h so that regeneration and resorption are in different fluid loops. With the example as taught by FIGS. 4 and 5d, the other arrangements become obvious to one skilled in the art from illustrated cycles. There are seven arrangements of thermodynamic cycles additional to that of FIG. 5d presented in abbreviated form. The two approaches, i.e., the single fluid loop of FIGS. 2 and 3 and the double fluid loop of FIGS. 4 and 5, offer different advantages and disadvantages for various applications. In order to provide minimum recuton in pinch effect penalties a double loop is preferred. But a single loop minimizes equipment requirements, and would therefore be preferred for many applications.

For those applications in which performance is most highly prized, i.e., those employing the most expensive heat sources such as solar applications or fuel oil used in remote locations, there are particular double loop processes which may be preferred for specific operating conditions. Thus, the process of 5d provides a high COP cooling or heat pumping by taking advantage of a high temperature of q cold; the process of 5g provides a high COP cooling or heat pumping by taking advantage of a high temperature of q hot; the process of 5c (in reverse mode) provides a high COP for temperature amplifying by taking advantage of a high waste heat temperature (T reject) and low reject temperature (T cold); the process of 5h provides a high COP for temperature amplifying by taking advantage of a low reject temperature (T cold) and low amplified temperature (T hot). Processes 5a and 5f permit a high T hot to be traded against a low T cold without a decrease in COP cooling or heat pumping. Conventional absorption processes do not permit such trade-offs. Process 5b permits a high reject temperature to be traded against a high T cold without loss in COP cooling or heat pumping. Process 5e permits a low T hot to be traded against a low T reject without loss in COP cooling or heat pumping. It is apparent that a single machine can be used to serve any of the FIG. 5 processes, since they differ only in three respects not requiring different equipment. These differences are: (1) the location of the regenerator and resorber in one or the other of the two fluid loops (equipment of the regenerator and resorber are identical); (2) the direction of fluid flow within each of the loops, which are independently selectible (and accomplished with suitable valving); and (3) the temperatures of the externally supplied heating and cooling circulants and the subprocesses to which these are directed. However, the latter are most efficiently accomplished with heat exchange area and design specific for the temperature range to be accommodated, so that different machines for the different FIG. 5 processes are preferred. The design (that is, chiefly, length requirement) of particular heat exchange sections for the various temperatures, depending chiefly on the viscosity and change in connection with temperature characteristic of the absorption fluid used is well understood to those practiced in the art, and is not a subject of this invention.

Returning to the variable effect process of FIGS. 2 and 3, these can also be employed as part of a larger process in which the high pressure and low pressure vapor flows interact with a Rankine converter. The converter may be a turbine, reciprocating converter, or a compressor. The converter may replace the condenser and evaporator of FIG. 2 or an additional condenser and an evaporator in series with a converter may be provided with the second condenser thermally coupled to the variable effect evaporator, and the second evaporator thermally coupled to the variable effect condenser. The additional condenser and evaporator permit use of a different working fluid with the Rankine converter than is used with the variable effect absorption process itself. With the former arrangement with no evaporator or condenser the variable effect process provides a source and sink for vapors at constant pressure by accepting and rejecting heat over ranges of temperature. With the latter arrangement the variable effect process provides a source and sink for heats at constant temperature (the Rankine condenser and evaporator) from an external source and sink available over ranges of temperature. That is, the variable effect absorption loop acts as a sensible/latent heat converter which augments the Rankine process. In both cases the benefits of the variable effect process are to greatly reduce pinch effects and to increase source and sink utilization compared to state-of-the-art Rankine processes, as was previously discussed for waste heat temperature amplification. Examples of process flow sheets for power production are FIG. 2 with a Rankine turbine replacing evaporation and condensation, and FIG. 2 with the addition of a Rankine evaporation subprocess coupled to condensation, a turbine, and a Rankine condensation subprocess coupled to evaporation. Examples of process flow sheets for pumping heat available over a range of low temperatures to heat available over a range of higher temperatures are FIG. 2 in the reverse mode with a Rankine compressor replacing evaporation and condensation and FIG. 2 in the reverse mode with the addition of a Rankine evaporation subprocess coupled to condensation, a compressor, and a Rankine condensation subprocess coupled to evaporation.

The process of FIGS. 2 and 3 can also be employed as part of a larger open-cycle separation process, for example, desalination. For this example, ocean water evaporation can replace the evaporation subprocess of FIG. 2, and the product water produced by condensation is removed instead of conducting it to evaporation. For this case, evaporation and condensation are thermally coupled, the heat for the former being provided by the latter.

Summaries of the applications for these several arrangements of the variable effect process that have been discussed are given below, together with the machines that would use them, and the benefits the variable effect process provides compared to state-of-the-art alternatives.

TABLE I

| Machine | Application | Benefits of the Variable Effect Process |
|---|---|---|
| Heat pump/chiller | Fuel-fired space heating or cooling | Reduced pinch effects, improved seasonal adaptation and performance, reduced power requirements for circulation of fluids |
| Heat pump/chiller | Solar and fuel fired space heating or cooling | As above, permits simultaneous solar and fuel energy input in any ratio the instantaneous solar capacity permits |
| Heat pump/chiller with coupled evaporator/condenser heat exchanger | Ocean temperature difference actuated desalination or fuel fired desalination | Ocean water never heated, reduced number of pressure stages for equivalent performance to other thermal desalination processes |
| Heat pump/chiller with reversed heat inputs and outputs | Waste heat temperature amplification | Reduced pinch effects, reduced power requirement for circulation of fluids, increased utilization of heat source, improved seasonal adaptation and performance |
| Latent to sensible heat converter (coupled with a Rankine compresser) | Electric heat pump performance improvement | Reduced pinch effects, reduced power requirement for circulation of fluids |
| Sensible to latent heat converter (coupled with a Rankine turbine or reciprocating converter) | Waste or solar heat actuated power generation | As above, increased utilization of heat source, improved seasonal adaptation and performance |

Referring to FIG. 6, a perspective drawing shows a machine in accordance with the present invention performing the variable effect process and using a rotating heat exchanger. The system is enclosed within a generally cylindrical outer tank having cylindrical side walls 44 closed by generally planar or slightly domed end walls 46 and 48. Within the stationary tank are rotatable cyclindrical drum members 50 and 52, connected, respectively, by support plates 54 and 56 to the rotating drive shaft 60 to produce rotation of the drums 50 and 52. The support plates 54 and 56 double as vapor impermeable dividing walls to separate the drums into two separate processing compartments each holding liquids by virtue of ring flanges 50a, 50 b, and 52a and 52b which permit liquids to accumulate in pools in the lowest porton of the drums due to gravitational effect. Rotation of the drums causes the liquids from said pools to be moved in thin layers around the internal surface of the drums. Wipers 49 and 51 are correspondingly located wipers with respect to each compartment are provided for controlling the thickness of these layers. At their internal ends, the drums are sealed from the chamber surrounding the drums in the cylindrical tank by sealing walls 62 and 64 and suitable seals 62a and 64a. A further vapor seal 60a prevents vapor leakage from or outer air leakage into the machine.

Within the output side of drum 50 between supported plate 54 and ring flange 50a is a pool 66 of a heating circulant supplied from a piped source 68 by means of a pump 70 and, in turn, removed from the pool by a line 72. Similarly, between the support plate 56 and the ring flange 52b, there is a pool of cooling circulant 74 supplied through line 76 and withdrawn from the pool by line 78 by virtue of pump 80. The principal processing solution of the system is supplied through line 82 to a generator pool or chamber 32' in the bottom of tank cylindrical walls 44 between end wall 46 and sealing wall 62 from which it is withdrawn by line 84 which is provided with fins 86 and which terminates in the resorber pool 34' within the section of rotating drum 50 defined by wall 54 and ring flange 50b constituting the resorber 34'. Liquid is removed from the resorber 34' through line 88 to heat exchanger 90 which allows heat exchange with the fluid passing into line 82. Thereafter the heat exchanger fluid from the resorber 34' passes by valve 94 into absorber chamber 36' at the bottom of the tank cylindrical walls 44 between seal wall 64 and end wall 48. Fluid is removed from the absorber 36' through line 96 having fins 98 and extending around and into the rotating drum 52, specifically into the regenerator pool 40', between the support plate 56 and the ring wall 52a.

Finally, fluid is removed from the regenerator 40' through line 100 by means of pump 102 which acts as a system circulator to move the fluid once again through heat exchanger 90 and back into line 82.

In the top of the cylindrical walls 44 of the tank above the rotating drums 50 and 52 are trays 104 and 106. Tray 104 is in the compartment between sealing wall 62 and end wall 46 and tray 106 is in the compartment between sealing wall 64 and end wall 48. Tray 104 is designed to contain liquid which is condensed by coil 108 the structure together providing condensor 38'. Coil 108 receives cooling circulant from supply line 110 and the warmed circulant passes out through line 112.

Tray 106 also provides a pool and a sprayer such as perforated pipe 116 which together with heating element 118 constitutes evaporator 42'. The heating element is, for example, a finned tube array containing heating circulant supplied through line 120 and exhausted through line 122. The sprayer is supplied with refrigerant condensed in 38' after throttling to the lower pressure by the valve in line 114.

The off-center shaft 60 supports the two heat exchanger drums 50 and 52 and the drums are rotated and continuously wetted inside by solutions or circulants on both sides of the support walls 54 and 56. FIG. 6a shows wiper 49 on the outside surface and wiper 51 on the inside surface of the drum 50. These and correspondingly positioned wipers on drum 52 are fixed to the stationary frames and specifically to end walls 46, 48, or sealing walls 62 and 64. These wipers control the thicknesses of the solutions for optimal heat transfer. The inside of the drum contains the intermediate pressure stage, and seals 62a and 64a are provided against vapor leakage from the generator or to the absorber.

Figure 7:
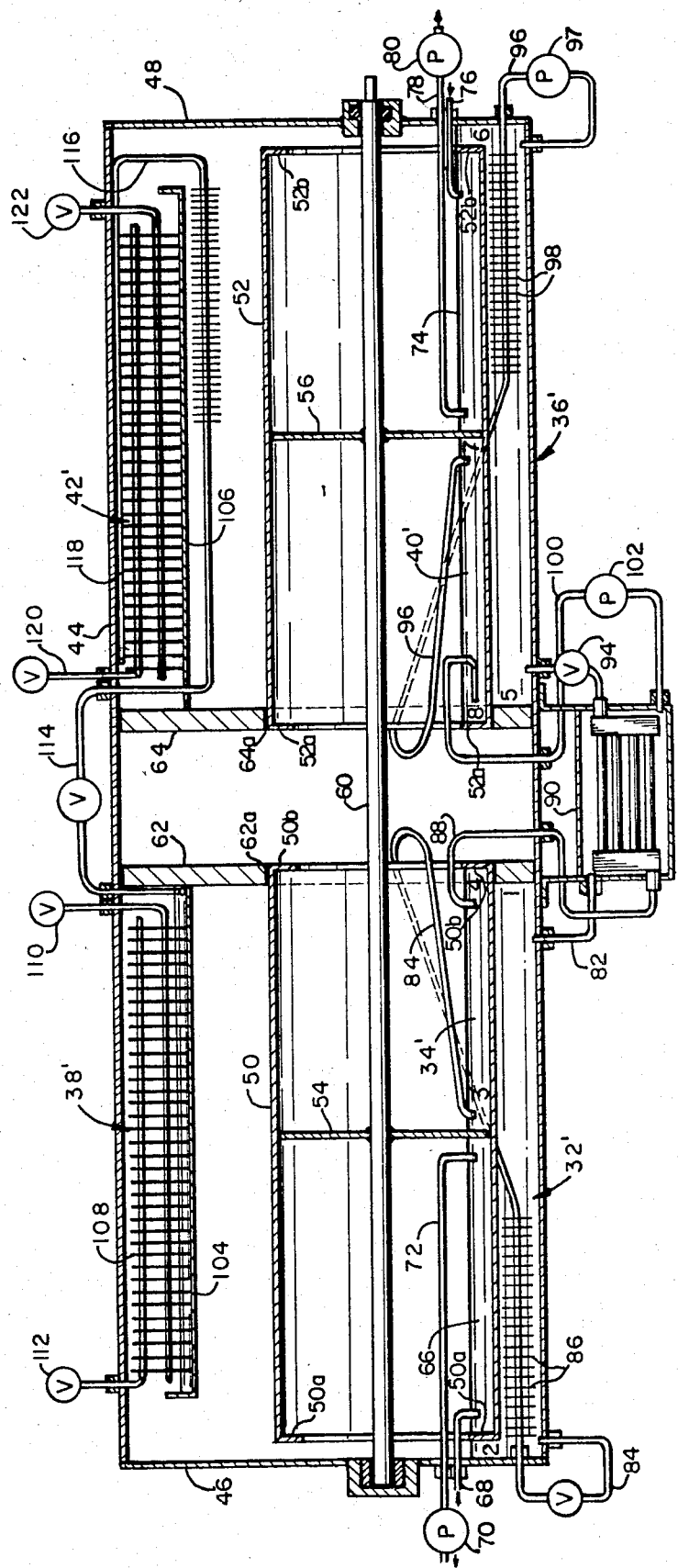
FIG. 7 is an axial sectional view of the structure of the present invention.

FIGS. 6 and 7 constitute one arrangement of pressure vessels and heat exchangers provided for the process of FIG. 2. Station numbers shown on FIG. 7 correspond to those for the ideal fluid cycle of FIG. 3. Solution at the highest system pressure flows from the solution heat exchanger 90 into the generator 32' at state 1. Heat for boiling the generator solution is first provided by resorber solution from pool 34' counterflowing in a thin film on the opposite side of the heat exchanger drum between support plate 54 and flange 50b and subsequently by the counterflowing heating circulant inside the drum surface between plate 54 and flange 50a and by generator solution returning to the resorber in finned line 84. The drum 50 also permits heat exchange with superheated vapor on its way to the condenser 38'. Solution exits the generator 32' at state 2, is throttled to the intermediate pressure, sensibly cooled by counterflow with generator solution in finned line 84 and enters the resorber pool 34' at state 3. The solution piping 84 extends from the generator 32' to the resorber pool 34' around the rotating drum and through the stationary seal. In the resorber pool 34' vapor (from regeneration) is condensed in the solution on the internal drum surface, and solution exits the resorber 34' at state 4. It is sensibly cooled in the heat exchanger 90, throttled to the lowest pressure in line 94, and enters the absorber 36' at state 5. In the absorber 36' vapor from the evaporator is condensed in the solution. The absorber heat is partially rejected to solution in regenerator 40' counterflowing in a thin film on the opposite side of the heat exchanger drum between plate 56 and flange 52a; the balance of the absorber heat is rejected to the counterflowing cooling circulant inside the drum between plate 56 and flange 52b, to the absorber solution returning to the regenerator 40' in finned line 96, and to vapor subcooled relative to the absorbing solution exiting the evaporator 42'. Solution exits the absorber 36' at state 6, is pumped to the intermediate pressure, is sensibly heated by counterflow with absorber solution in finned line 96, and enters the regenerator 40' at state 7. In the regenerator 40' heat for boiling is provided by the absorber 36' and the vapor is conducted to the resorber 34'. The solution exits the regenerator 40' at state 8, is pumped to the highest pressure, and is sensibly heated in the solution heat exchanger 90, to state 1, thus completing the solution cycle. The condenser 38' and evaporator 42' are cooled and heated in a conventional manner.

Heat transfer between the absorbent solution and the sensible heating and cooling circulants and internal heat transfer between solutions in the different pressure stages occurs across the rotating drum. There are four advantages for this design compared to a design using the more usual stationary heat exchangers. First, because solution layer thicknesses control permits higher heat and mass transfer rates. Second, the internal heat exchanger approach penalty is minimized by this design. Because the effective heat capacity flow rate of the absorbent solutions (Btu/hr °F.) varies with concentration, a stationary heat exchange design with an intermediate sensible circulant would incur two pinch effect penalties with an intermediate sensible circulant. Third, the intermediate circulant loop and controls which the stationary design would require are not needed with the rotating design. Fourth, the drum is more easily massfabricated and the machine more easily assembled than would be the case if the usual state-of-the-art stationary tube or plate bundles were used.

The drum surface is illustrated as a smooth cylinder for clarity. It may also be corrugated or finned in various ways. There are two major design considerations which determine if corrugation is desirable and to what extent; the total surface area of the drum is proportional to its heat exchanging capacity, and the cross sectional area of the drum is proportional to its vapor handling capacity. For large capacity machines, and especially if high pressure fluids such as water-ammonia are used, corrugation is desirable in order to reduce the length and diameter of the drum. Heat losses to ambient and the costs of fabrication and handling are thereby also reduced. The relative lengths of the several sections of drum as illustrated by FIGS. 6 and 7 may vary widely for different applications. For some applications the drum need not be extended to include the heating and cooling circulants. Conventional stationary pot boilers or spray equipment may be used for these sections of the generation and absorption subprocesses not involving internal heat transfer.

FIGS. 6 and 7 do not show accumulators, bleed lines, purge for non-condensibles, or controls. The form of the evaporator and condenser heat exchangers, vapor precooler, solution heat exchangers, seals and bearings, and the piping and other component layout have been shown schematically for clarity. It will be understood that conventional known hardware can be used in these functions. It will also be apparent that the hardware can be employed, as noted above, with other processes. Either the variable effect or the other processes can use a machine having only a single drum.

The process of FIG. 4 can be accommodated by a machine similar to that of FIGS. 6 and 7, using a second rotating heat exchanger drum or additional sections of a single drum for the evaporator and condenser. Arrangements for interconnection using the rotating heat exchanger drum with other two fluid variable effect processes or with Rankine converters will be easily discernable to one skilled in the art with the aid of FIGS. 6 and 7.

A special arrangement for desalination is the machine of FIGS. 6 and 7 with the evaporator and condenser replaced by a common heat exchange surface. Ocean water may be throttled through a turbine into the low pressure evaporator side, sprayed on the common surface, and pumped out using shaft power from the throttling turbine. Product condensate which forms on the other side of the surface is also pumped out. For this application a large capacity corrugated drum, a much smaller capacity spray absorber, and a much smaller capacity pot boiling generator would be used. A particular advantage of the variable effect process for desalination is that the seawater is not substantially heated above its inlet temperature, so that scaling and corrosion, which plague most thermally actuated desalinators, do not occur. A second advantage is that only three pressure stages are required, in contrast to the dozen or more stages required with conventional thermal desalination processes achieving the same level of performance.

Figure 8A:
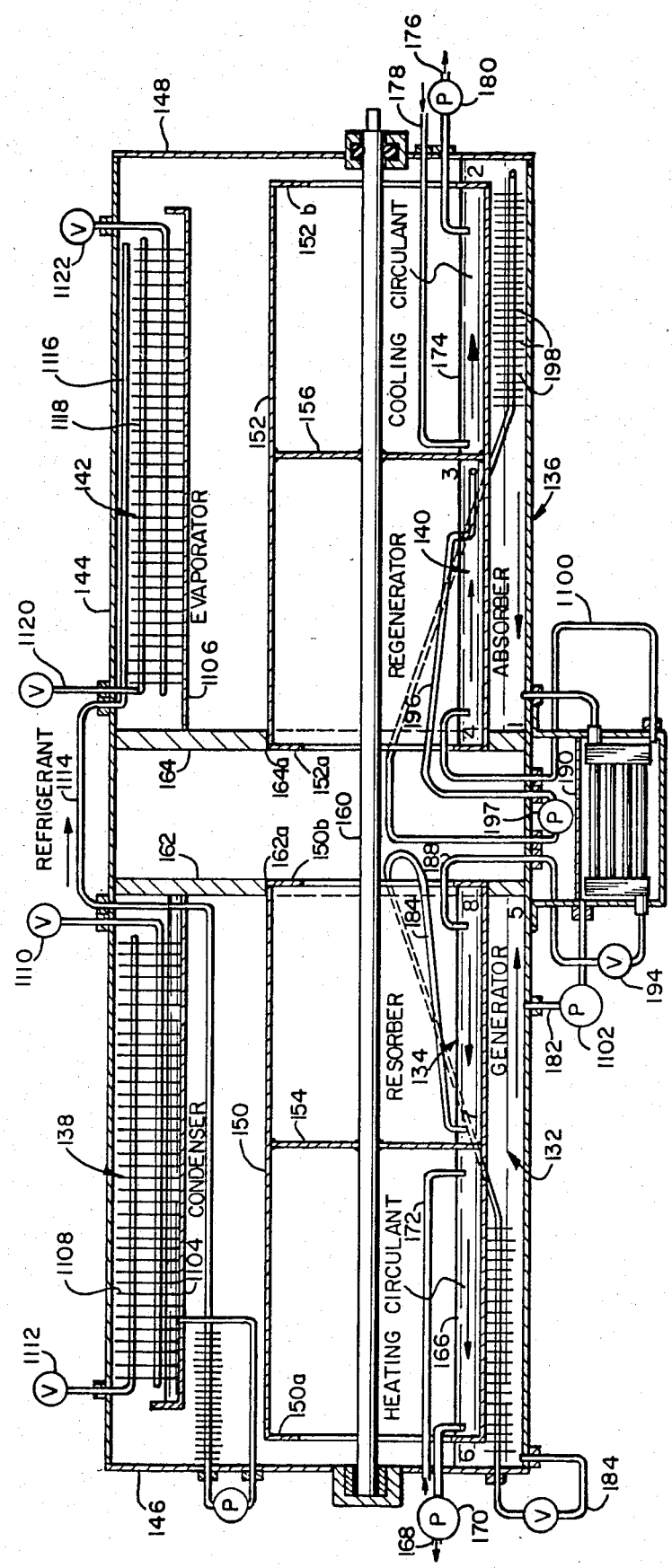
FIGS. 8A through 8C are schematic diagrams illustrating various modifications of the FIG. 7 machine to tailor it for specific purposes.
Figure 8B:
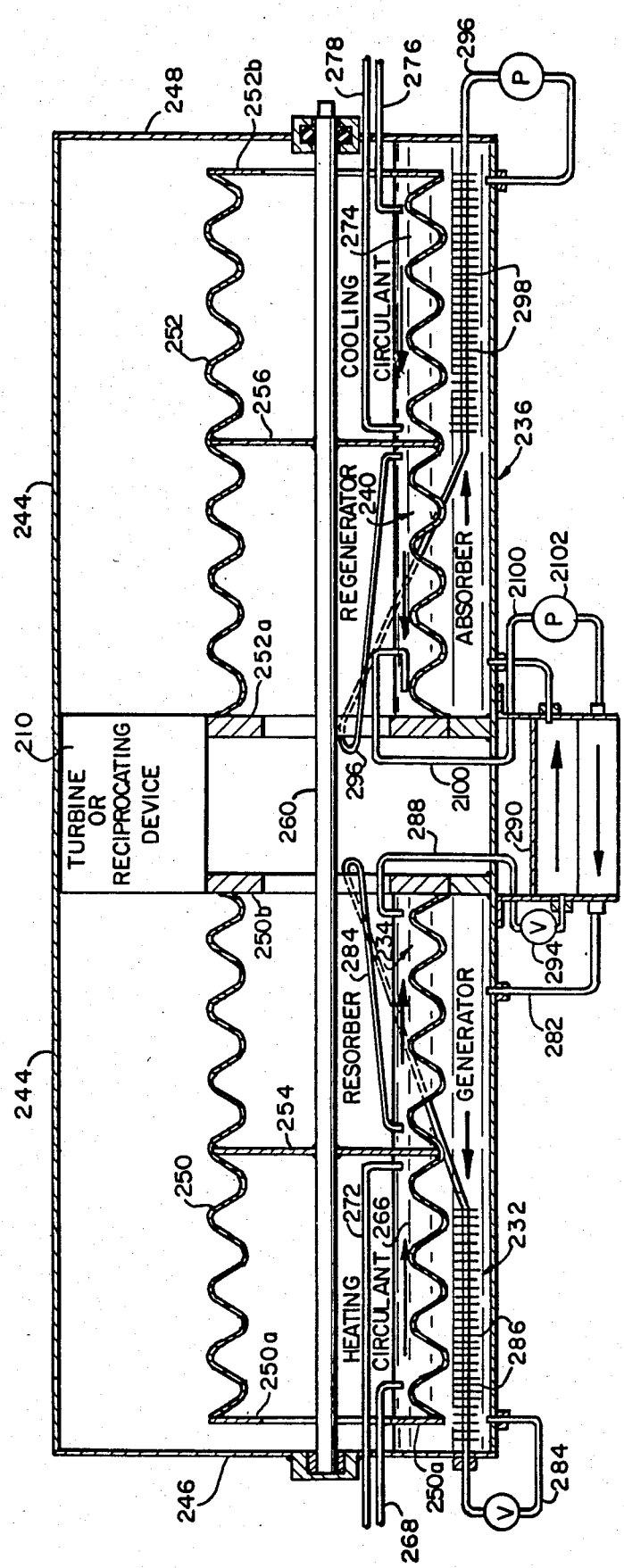
Figure 8C:
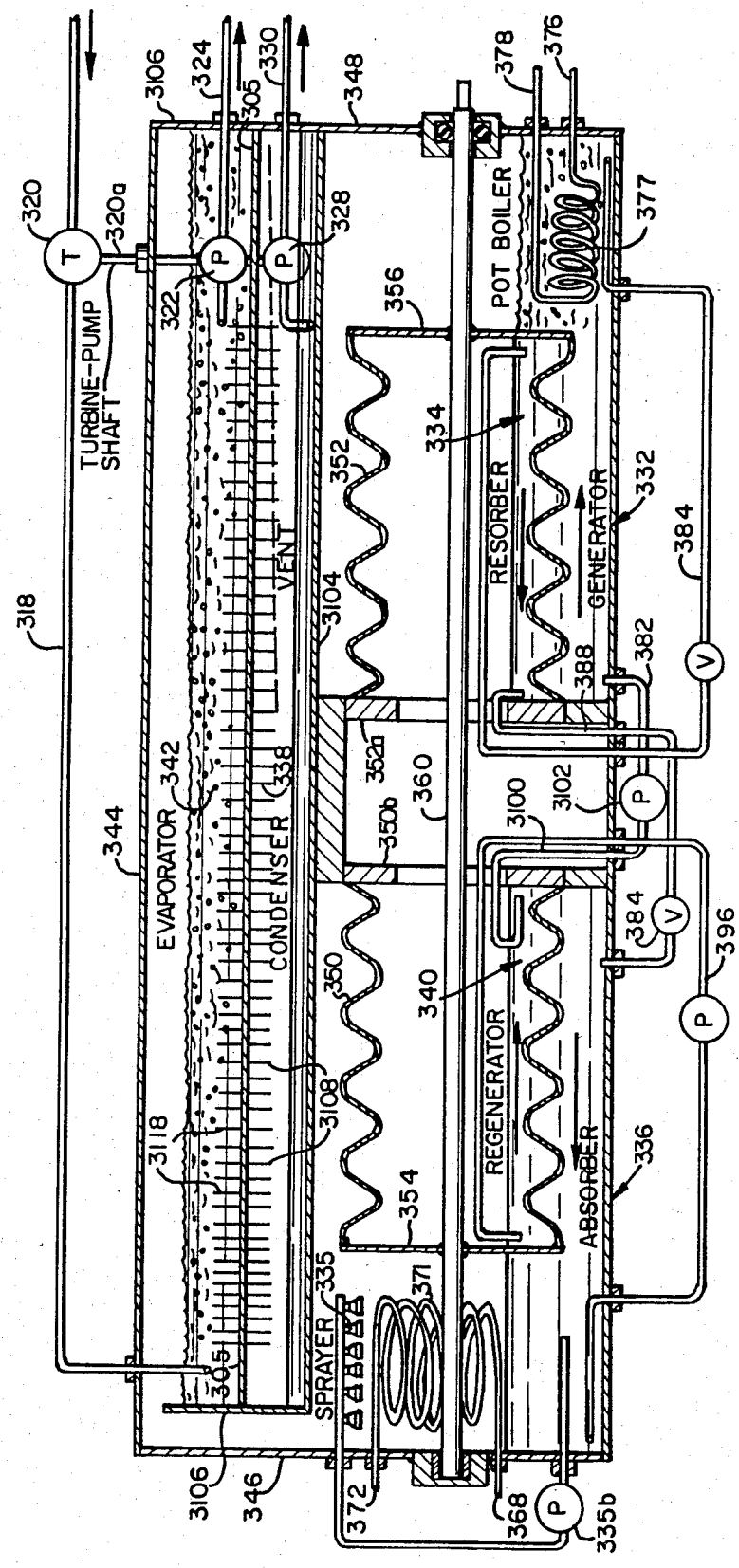

FIGS. 8A through 8C are schematic diagrams which illustrate certain modifications to the FIGS. 6 and 7 heat pump/chiller machine to adapt it for other specific purposes. FIG. 8A shows a FIG. 7 machine modified for temperature amplifying. The structure physically looks much the same as FIG. 7 and therefore the corresponding parts have been given similar number designators with the addition of a "1" prefix to the number used in FIG. 7 where those numbers correspond. The locations of the heating and cooling circulants, generator, absorber, regenerator and resorber are the same. The absorber and evaporator operate at a higher pressure and temperature than the generator and condenser, the opposite of the FIG. 7 heat pump, and all flow directions of absorbent solution are reversed. For example, it will be observed that the direction of flow in lines 168 and 172 have been reversed. This is true also of the direction of flow in the heating circulant pool 166. A further observation shows that the corresponding thing is true in lines 176 and 178 with cooling circulant pool 164. The reversal of flow which has taken place is also indicated by the thermal cycle state numbers which have been rearranged. The pumps and valves have been moved to the generator end of the machine as much as possible because the generator operates at lower temperatures than the absorber, in contrast to the FIG. 7 heat pump for which the opposite is true. For example, pumps 1102 and 197 and valve 194 have been moved. Because of the pressure reversal, a pump is added to line 114 to replace the throttling valve of FIG. 7 between the condenser and evaporator. Slight modifications to the piping of FIG. 7 are made in FIG. 8A to prevent cavitation of pumps when moving fluid from low to higher pressure. A vapor precooler for the FIG. 8A machine is located at the condenser just after the pump for better performance, rather than a liquid precooler at the evaporator, as for the FIG. 7 machine. Spray line 16 runs directly across the top of the evaporator without a precooler.

FIG. 8B shows a FIG. 7 machine modified as a sensible/latent heat converter for power generation or for improved performance of electrical heat pumps. Especially for the former purpose, a large capacity requirement and high pressure fluid such as ammonia-water or R-22 and organic amides, is anticipated, so that corrugated heat exchange drums 250, 252 are employed; this need not be done for smaller machines. Again, number designators corresponding to those used in FIG. 7 are provided with the addition of a prefix "2". Piping and absorbent flow directions for power generation are the same as those of the FIG. 7 machine. Fins (not shown) could be added to the outside surface of the corrugated drum to enhance heat transfer between the vapors and the drum for improved performance. Wipers are advantageously employed but must be suitably modified to conform to the corrugated shape. Use of fins would be especially desirable if an organic fluid, such as R-22 and hexyldiamide, were used, since such materials have high vapor sensible heat capacities. In view of the different function, evaporator and condenser structure is omitted, and the Rankine converter is substituted.

The added Rankine converter 210 may be a turbine or reciprocating converter for power generation. For electric heat pump improvement the Rankine converter would be a rotary or reciprocating compressor and all flow directions would be the reverse of those shown by FIG. 8B, i.e., similar to those of FIG. 8A.

If the heat pump of FIG. 8B were intended for industrial waste heat upgrading, changes in pump and valve location similar to those made for the temperature amplifier of FIG. 8A would be appropriate. Vapor duct design and converter support structure and location would vary depending upon the converter type and size and upon the fluid used.

As has been mentioned, freedom to use different fluids in the variable effect subcycle and Rankine subcycle may be obtained by using coupled variable effect condenser-Rankine evaporator and variable effect evaporator-Rankine condenser heat exchangers. This can provide optimized performance for each subcycle and increased flexibility of mechanical design in return for heat exchange performance and cost penalties. For this approach, power generation or electric heat pump improvement would be obtained using the previously discussed machines, respectively, the heat pump/chiller of FIG. 7 or the temperature amplifier of FIG. 8A, with modified evaporator and condenser.

FIG. 8C shows a FIG. 7 type machine adapted for desalination. In this case, parts corresponding to those in FIG. 7 are provided with the same number designators having a 3 prefix. Again, large capacity is assumed, so that corrugated drums 350, 352 are used. Almost all of the heat exchange within the machine is either to the regenerator 340 or from the resorber 334 because the pressure difference between the evaporator 344 and condenser 338 will be small, determined by their heat exchange approach temperature difference. The temperature ranges of operation for those sections of the generator and absorber exchanging heat with the external circulants will be small also. Thus, heating circulant chamber 66 and cooling circulant chamber 74 are omitted and each drum 350, 352 provides only one chamber. Therefore, a pot boiler 377 and conventional spray absorber 335 are cost-effective choices for the external heat exchange compared to using the drum for both internal and external heat exchange. Regeneration chamber 340 is then defined by drum 350 with wall 354 and ring flange 350b and resorber chamber 334 is defined by drum 352 within wall 356 and flange 352a, with the two chambers being open to one another for free vapor exchange at middle pressures. Sprayer 335 acts on coil 371 connected by lines 337a 337b to lines 368 and 372 which supply the cooling circulant. Pump 335b recirculates solution from the absorber pool through line 368 to the sprayer. Boiler coil 377 is supplied with heating circulant by lines 376 and 378.

Because of the small pressure difference, the coolest end of the resorber 334 and hottest end of the regenerator 340 are very nearly at the same temperature, so that the solution heat exchanger of FIG. 7 may be eliminated. Line 382 is connected to line 3100 via pump 3102 and 388 is connected through valve 394 without the heat exchanger. If efficiency were of paramount importance, the solution heat exchanger could be used. Fins, not shown, could be used on both drums sections to enhance sensible heat recovery from vapors. The evaporator 342 and condenser 338 have a single heat exchange surface 305 augmented with fins 3118 and 3108, so that all of the heat needed for the former is supplied by the latter. This does not permit an exact mass balance between the condenser and evaporator flows because the enthalpies of vaporization of seawater and pure product water differ slightly. Since the rates of water condensed and evaporated must be equal for steady state operation of the machine, a small bleed line from the condenser to the evaporator and controls for the seawater and product water pumps, not shown, would be required. A condenser vent 339 is shown which permits vapor flow to the condenser from the generator; a slightly sloping tray below the vent holds product water to one side for removal by pump 328. A turbine-pump combination is shown by FIG. 8c for the recovery of work generated by turbine 320 throttling seawater at atmospheric pressure down to the low operating pressure of the absorber. This work plus additional auxiliary work input, not shown, would be used via shaft 320a to pump exhausted (concentrated in salt) seawater in the evaporator and product in the condenser from the low pressures inside the machine back to atmospheric pressure with pumps 322 and 328. Other arrangements for the turbine-pump and connections with auxiliary power could be provided.

FIGS. 7, 8A, 8B and 8C represent preferred embodiments of rotating drum members, some of which have circumferential surface extension. These embodiments represent horizontally-rotated, drum-type, and counterflow heat exchangers for use in absorption machines. As a further feature the heat exchanger preferably employs two axially counterflowing fluids, at least one of which is an absorption fluid, as known in the prior art, and which changes in concentration and temperature concurrently with evaporation or condensation of the volatile absorption fluid component at a constant pressure.

The rotating drum means is preferably compactly extended circumferentially, for example, with circular or helical corrugations or with circular or helical fins. These circumferential extensions segment the axial fluid flows into many small volumes isolated from each other. The drum means is held generally horizontally to permit the axial counterflow of the two fluids as films over its interior and exterior surfaces. One or both of these films is exposed to a vapor volume containing the volatile absorption fluid component at constant pressure. The vapor volume is either within the interior of the drum or within the volume between the outside surface of the drum and a surrounding housing, or both of these, if two absorption fluids are used. The rotating drum interior access means for liquid, or for liquid and vapor, and sealing means for isolating the interior vapor volume may be provided. Rotation permits renewal of vapor-equilibrated absorption fluid film with fresh fluid from a gravity pool inside or outside of the drum, or in both locations. Bearing means for mechanical support of the rotating drum are provided. The gravity pool is either the volume between the extensions of the interior drum surface at its bottom or low side or the volume between the extensions of the exterior drum surface and a surrounding housing, or both of these.

Means for rotating the drum may, for example, include a coaxial shaft or either a hermetically sealed motor inside the shell or a magnetically coupled motor exterior to the shell, which features are known in the art and may be optionally used with this invention.

Figure 9A:
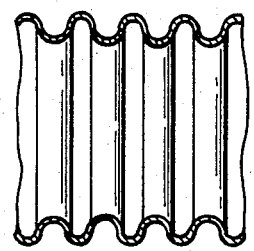
FIGS. 9a through 9l are schematic drawings representing different kinds of drum construction that can be used within the machines of FIGS. 6 through 8C or other absorption equipment.
Figure 9B:
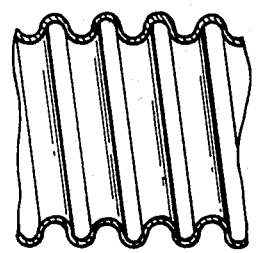
Figure 9C:
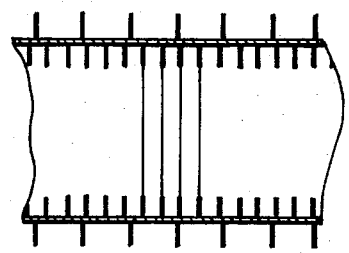
Figure 9D:
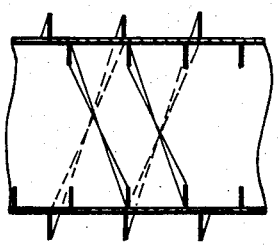
Figure 9E:
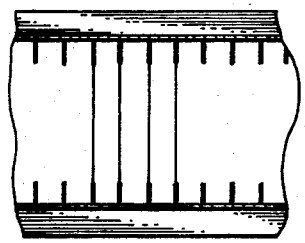
Figure 9F:
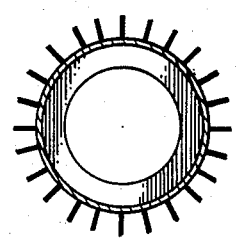
Figure 9G:
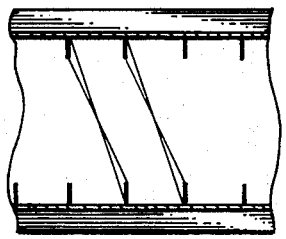
Figure 9H:
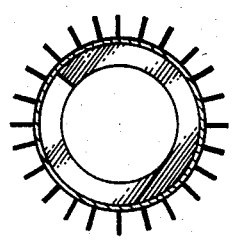
Figure 9I:
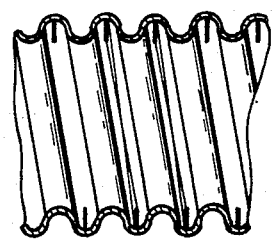
Figure 9J:
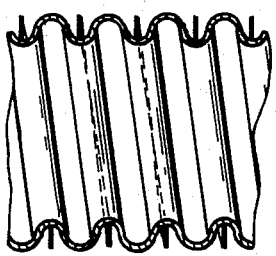
Figure 9K:
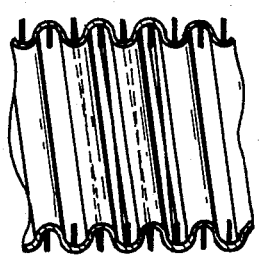
Figure 9L:
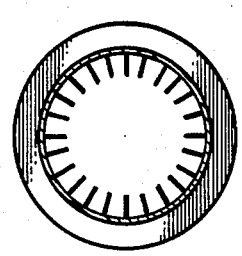

FIGS. 9a through 9l are illustrations of various corrugation and fin styles and combinations of styles which are readily produced by various methods well known in the art and advantageously employed for the horizontal rotating heat exchanger and mass transfer drums used in the FIGS. 6 through 8C machines or other absorption machines. FIGS. 9a and 9b are, respectively, cross sections of drums with corrugations producible by hydraulic forming and helical corrugations producible by rolling. Circular corrugations have an advantage in that they can be made deeper than helical corrugations. Helical corrugations have an advantage in that fluid is axially screw conveyed by the drum rotation, as well known in the art, which permits higher relative fluid velocities at the surface with fluid pumped in opposition to the screw conveyance. Fluid on the opposite side would have a lower velocity with helical than with circular corrugations. Hence, the helical style lends itself best for use with an absorption fluid on one side and a sensible circulant on the other. FIGS. 9c and 9d are, respectively, cross sections of drums with circular fins producible by press-fitting and helical fins producible by press-fitting of an internal fin or continuous welding of an external fin. As is true for corrugations, the helical style fin is most appropriate for use with one absorption fluid and one sensible fluid. Both the circular and helical fins have the advantage compared to corrugations of different spacing inside and outside the drum for machines efficient to the heat transfer requirements of the two fluids. FIGS. 9e and 9f are, respectively, a cross section and an end view of a drum with interior circular fins and exterior longitudinal fins. The longitudinal fins lend themselves well for use with air or exhaust gas, and the circular fins with an absorption fluid. Longitudinal fins are producible by continuous welding or by extrusion. FIGS. 9g and 9h are, respectively, a cross section and an end view of a drum with interior helical fins and exterior longitudinal fins. The same advantages for particular uses are obtained as is true with longitudinal and helical fins in the earlier examples. FIG. 9l is an end view of a drum with interior longitudinal fins and exterior circular or helical fins, again obtaining the advantages of these styles as already described. FIGS. 9i, 9j and 9k are cross sections of helically corrugated drums including, respectively, interior helical fins, exterior helical fins, and both interior and exterior helical fins. The combinations are producible by threading the fins onto the corrugations. These combinations permit more compact heat exchangers than obtainable with helical corrugations alone. It will be apparent to one skilled in the art that other combinations of fins and corrugations can be produced which are suitable for various combinations of absorption and sensible or Rankine fluids.

Figure 10:
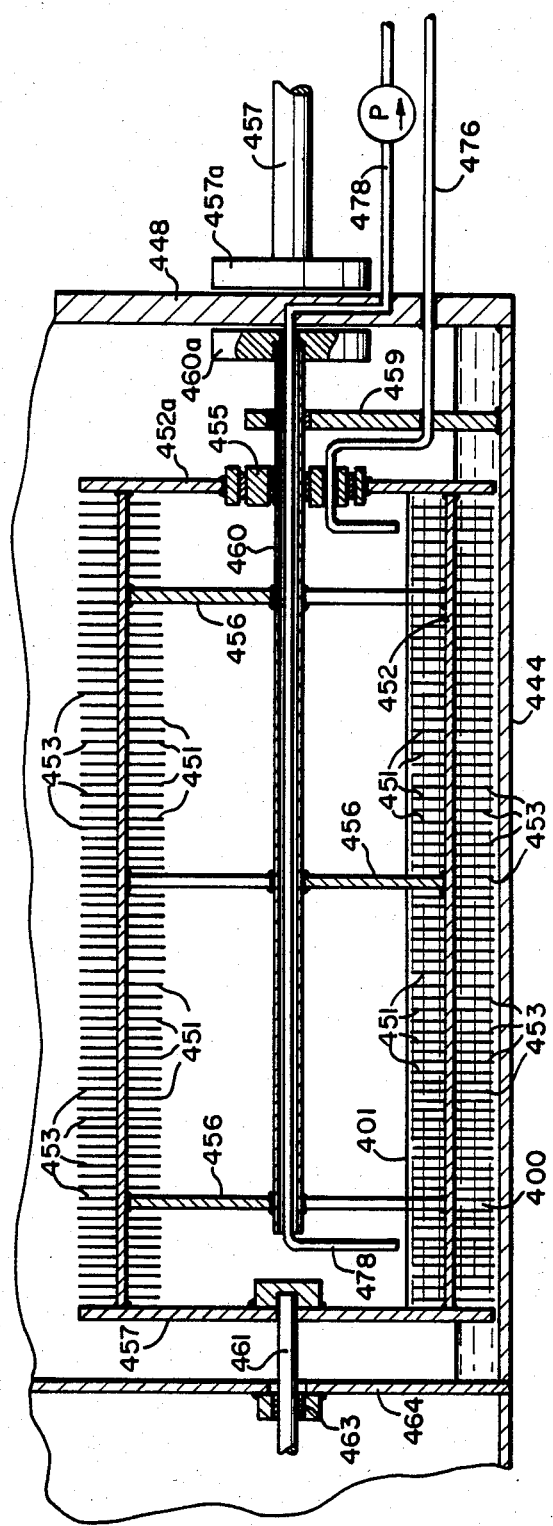
FIG. 10 is a partial sectional drawing showing an internal drum of the type shown in FIGS. 7 through 8C employing a modified support and plumbing construction.

FIG. 10 is a cross sectional view of a circumferential surface extended, horizontally-rotated, and counterflow heat exchanger drum and vapor absorbing or releasing device for use in absorption machines similar to those in FIGS. 7, 8A, 8B and 8C. Numbers corresponding to those used in FIG. 7 are employed to designate similar parts but with the addition of a prefix 4. Thus, the housing or outer tank has its cylindrical walls designated 444 and the end wall 448 is the only one seen in this partial view. The rotating drum is 452. In the FIG. 10 embodiment, one of two axially counterflowing fluids is an absorption fluid 400 which changes in concentration and temperature concurrently with evaporation or condensation of the volatile absorption fluid component at a constant pressure. The second fluid 401 is a sensible circulant. The use with an absorption fluid and a sensible fluid is contemplated in FIGS. 6 through 8C. Embodiments with two absorption fluids have also been described generally in the discussion of FIGS. 6 through 8C and combinations of an absorption fluid and a Rankine fluid have been mentioned above. In this embodiment, both liquid and vapor phases of the fluids inside and outside of the drum 452 are isolated from one another.

The drum 452 is compactly extended with both inwardly extending circular fins 451 and outwardly extending circular fins 453. Other fin or corrugation styles, e.g., those illustrated in FIGS. 9a through 9l, may be employed alternatively. These circumferential extensions segment the axial fluid flows into many small volumes each isolated from the other, and inhibit unwanted fluid volume mixing. The drum 452 has both ends closed, one by flange 452a and stationary bushing 455 through which extends hollow drive shaft 460, with bearings between the bushing and each rotating member. The other end of drum 452 is closed by wall 457 which supports stub drive shaft 461 in turn rotatably supported by bearing block 463 in housing wall 464. The drum 452 is held approximately horizontally to permit the axial counterflow of the two fluids as films over its interior and exterior surfaces. The closed ends of the drum isolate both liquids and vapors inside and outside of the drum from one another. Pool 400 collects by gravity in the bottom of housing wall 444 to supply the film on the outside surface of drum 452 and pool 401 collects by gravity in the bottom of the inside of the drum 452 to supply the film on the inside surface of drum 452. One of these films, for example on the outside of drum 452, is exposed to a vapor volume containing the volatile component of the absorption fluid at constant pressure. The interior volume may be used in other embodiments, and both volumes contain the volatile component of the fluid, if two absorption fluids are used. Drum interior access for liquid, or for liquid and vapor, and sealing means for isolating the interior vapor volume are provided through bushing 455 and hollow shaft 460. In FIG. 10 these are the circulant outlet pipe 478 which passes through the shaft and the housing end wall 448 and the inlet pipe 476 which passes through the bushing 455 and a stationary seal in the housing end wall 448. Rotation permits renewal of the vapor-equilibrated absorption fluid film with fresh fluid from gravity pools 400 and 401. Cylindrical bearings for hollow shaft 460 are supported on support segment 459 in turn affixed to housing wall 444.

FIG. 10 also shows means for rotating the drum without providing a rotating seal through the housing using magnetic coupling means. For example, a motor shaft 457 of a driving motor (not shown) coaxial with the axis of drum rotation may be terminated in a circular magnetic piece 457a providing a coupling pole face. Inside the housing a similar circular magnetic pole piece 460a is fixed to hollow shaft 460. Close positioning of pole pieces 460a and 457a enable magnetic coupling through non-magnetic wall 448 to the motor to drive the central hollow shaft 460. Shaft 460, in turn, drives drum 452 to which it is attached at the drum inner wall by support spokes 456. Other means, such as a hermetically sealed motor, or an internal liquid or vapor turbine could be used instead.

Any of the FIG. 7 through FIG. 8C machines or others could be designed as modules of larger machines in which the modules could be served by common pumps and throttling valves selected to permit variable flow rates which might be desired for capacity control. Such variable valves and pumps could be used on single modules also, but less cost-effectively. Large capacity heat pumping, temperature amplifying, power producing, or desalinating applications would benefit from such modularity by the increased flexibility of operation and standardization of manufacture which modularity typically provides.

The present invention has been described in terms of broad process concepts and functional blocks representative of machinery or systems. A specific example of one preferred form of a single fluid loop variable effect machine has been illustrated and described. Modifications to each of the illustrated and described processes and to the machine have been described. Further modifications appropriate to the applications listed in Table 1, or others, will occur to those skilled in the art. All such modifications within the scope of the appended claims are intended to be within the scope and spirit of the present invention.

I claim:

1. A thermal machine for producing variable effect thermal processes comprising:
    an outer housing;
    means for coupling to drive means outside the housing for producing rotational movement;
    a horizontal rotatable shaft within the housing and coupled to drive means generally outside the housing;
    at least one hollow cylindrical drum means within the housing fixed concentrically to the shaft to rotate with the shaft;
    means associated with each such drum means to permit the collection of at least one pool of liquid within and along the inner sidewall of the drum means;
    means within the outer housing to permit the collection of liquid in at least one separate pool in contact with the outer sidewall surface of each such drum means;
    sealing means permitting rotation of each such drum means but isolating vapors within the drum means from pools within the outer housing and vapors from the other housing pools from one another; and
    piping to transfer liquid from selected pools within the housing and each such drum to provide flow from pool to pool in a selected sequence.

2. The thermal machine of claim 1 in which the outer housing is cylindrical with its axis generally horizontal and the axis of the at least one rotating drum means is parallel to the cylinder axis but off center to put the rotating drums near the bottom of the housing to minimize the volume of absorbent solution required.

3. The thermal machine of claim 1 in which a pair of coaxial rotating drum means are spaced axially from one another along said shaft and the sealing means includes a pair of generally parallel spaced apart transverse walls having openings permitting at least passage of the shaft, piping, and a vapor flow path between internal portions of the drums which are arranged facing one another and extending away from the sealing walls, and the sealing elements between the rotating drums and the fixed walls permit maintenance of different pressures on opposite sides of the walls.

4. The thermal machine of claim 3 in which further hollow cylindrical drum means within the housing are fixed concentrically to the shaft outboard of the pair of drum means to rotate with the shaft and having means to permit collection of pools of liquid within and along the inner sidewall of each of the further drum means, said drum means being open to provide access for means to supply to and remove from the pools within each of the further drums.

5. The thermal machine of any of the claims 1 through 4 in which the drum means are provided with circumferentially extending corrugations.

6. The thermal machine of any of the claims 1 through 4 in which the hollow cylindrical drum means are provided with heat exchange fins.

7. The thermal machine of any of the claims 1 through 4 in which the drum means are provided with wipers fixed with respect to the housing to control the thickness of liquid films on the inside of the drum means.

8. The thermal machine of any of the claims 1 through 4 in which wipers are fixed with respect to the housing relative to the outer surface of the hollow cylindrical drum means to control liquid thickness on the outer surface of the drum means.

9. The thermal machine of claim 2 in which the fluid connections include a connection between each of the pools within the drums and different ones of the pools in the housing outside of the drums and a heat exchanger is provided between the respective connections.

10. The thermal machine of claim 3 in which separate evaporator and condenser means are provided in the housing above the rotating drum means on the respective sides of the partitions.

11. The thermal machine of claim 10 in which the evaporator includes a sprayer and heat exchange means intended to evaporate the liquid absorbent and the condenser includes heat exchange means intended to act upon and condense vapor and a collection tray and suitable means is provided to transfer liquid collected in the condenser tray to the sprayer of the evaporator.

12. The thermal machine of claim 2 in which a pot boiler element is included in one of the pools of the housing and a sprayer is included to spray liquid from the other pool to help condense gases from the evaporator.

13. The thermal machine of claim 12 in which a condenser and evaporator apparatus are provided above the rotating drums in the housing with the evaporator subject to heating and a boiling action at the designated pressure of the stage and the condenser being subject to cooling.

14. The thermal machine of any of the claims 1 through 4 in which at least one of the rotating drum means has effective surface area enlargement means.

15. A housing which permits collection of a gravity pool, a generally horizontally-oriented, rotatable drum heat exchanger and vapor absorbing and releasing device supported relative to the housing for rotation about a generally horizontally positioned axis, which drum extends into the gravity pool of the housing and which drum is used for heat exchange between fluids respectively on the inside and outside walls of the drum and used simultaneously for absorbing or releasing a volatile component of at least one of the fluids between the drum surface and a contiguous vapor space, such that at least one of the fluids interacting with the vapor space is an absorption fluid which is carried through the vapor space as a thin film on the drum surface, and has end walls at least sufficient to permit the collection of a gravity pool of fluid within the drum and separate the pool within the drum from the pool outside the drum within the housing, and conduit means supported relative to the housing to permit the passage of fluids into and out of the drum interior.

* * * * *